United States Patent
Relyea et al.

(10) Patent No.: US 11,222,528 B2
(45) Date of Patent: Jan. 11, 2022

(54) TRAFFIC MONITORING SYSTEMS AND METHODS

(71) Applicant: Verizon Patent and Licensing Inc., Arlington, VA (US)

(72) Inventors: Donald H. Relyea, Dallas, TX (US); Michelle Felt, Randolph, NJ (US)

(73) Assignee: Verizon Patent and & Licensing Inc., Basking Ridge, NJ (US)

( * ) Notice: Subject to any disclaimer, the term of this patent is extended or adjusted under 35 U.S.C. 154(b) by 7 days.

(21) Appl. No.: 16/447,430

(22) Filed: Jun. 20, 2019

(65) Prior Publication Data
US 2019/0304295 A1  Oct. 3, 2019

Related U.S. Application Data

(63) Continuation of application No. 15/597,047, filed on May 16, 2017, now Pat. No. 10,373,488, which is a
(Continued)

(51) Int. Cl.
*G08G 1/01* (2006.01)
*G08G 1/0967* (2006.01)
(Continued)

(52) U.S. Cl.
CPC ............ *G08G 1/012* (2013.01); *G08G 1/00* (2013.01); *G08G 1/0104* (2013.01);
(Continued)

(58) Field of Classification Search
CPC .......... G08G 1/096775; G08G 1/0104; G08G 1/096716; G08G 1/161; G08G 1/01; G08G 1/096741; G08G 1/09675; G08G 1/096811; G08G 1/0141; G08G 1/096758; G08G 1/096791; G08G 1/096844; G08G 1/00; G08G 1/012; G08G 1/0129; G08G 1/052; G08G 1/056; G08G 1/092; G08G 1/094; G08G 1/09626; G08G 1/096838; G08G 1/096883; G08G 1/127; G08G 1/202; G01S 19/14; G01S 19/52; G01S 2205/002; G01S 5/0027; G01S 5/0045; G01S 5/0072; G01S 5/02; G01S 5/0252; G01S 5/0263;
(Continued)

(56) References Cited

U.S. PATENT DOCUMENTS 4,792,803 A * 12/1988 Madnick ................ G08G 1/093
340/905
5,164,904 A * 11/1992 Sumner ................ G08G 1/0104
340/905
(Continued)

*Primary Examiner* — Bhavesh V Amin

(57) ABSTRACT

In an exemplary method, a traffic monitoring subsystem receives mobile device attribute data from a plurality of mobile devices over a network, selectively aggregates the mobile device attribute data, the selectively aggregating including identifying anomalous data in the mobile device attribute data and excluding the anomalous data from the aggregated mobile device attribute data, and generating traffic condition data based at least in part on the aggregated mobile device attribute data, the traffic condition data representative of a traffic condition. In certain examples, the traffic monitoring system provides the traffic condition data to at least one of the mobile devices.

20 Claims, 16 Drawing Sheets

Related U.S. Application Data continuation of application No. 15/197,562, filed on Jun. 29, 2016, now Pat. No. 9,711,044, which is a continuation of application No. 14/270,128, filed on May 5, 2014, now Pat. No. 9,418,544, which is a continuation of application No. 12/108,247, filed on Apr. 23, 2008, now Pat. No. 8,718,928.

(51) Int. Cl.

| *H04W 4/50* | (2018.01) |
|---|---|
| *G08G 1/00* | (2006.01) |
| *G08G 1/052* | (2006.01) |
| *G08G 1/056* | (2006.01) |
| *G08G 1/09* | (2006.01) |
| *G08G 1/0962* | (2006.01) |
| *H04L 12/24* | (2006.01) |
| *H04W 4/02* | (2018.01) |

(52) U.S. Cl.
CPC ......... *G08G 1/0129* (2013.01); *G08G 1/0141* (2013.01); *G08G 1/052* (2013.01); *G08G 1/056* (2013.01); *G08G 1/094* (2013.01); *G08G 1/09626* (2013.01); *G08G 1/09675* (2013.01); *G08G 1/096716* (2013.01); *G08G 1/096775* (2013.01); *H04L 41/22* (2013.01); *H04W 4/027* (2013.01); *H04W 4/50* (2018.02)

(58) Field of Classification Search
CPC ..... H04W 4/00; H04W 4/029; H04W 64/006; H04W 84/18; H04W 24/00; H04W 24/02; H04W 28/06; H04W 48/08; H04W 4/02; H04W 4/023; H04W 4/027; H04W 4/50; H04W 64/00; H04W 88/02; H04W 88/06; H04W 8/02; B60R 16/0232; G01C 21/32; G01C 21/3415; G01C 21/3438; G01C 21/3461; G01C 21/3476; G01C 21/3492; G01C 21/3691; G06F 8/65; H04B 17/318; H04L 12/2827; H04L 12/4633; H04L 2012/2841; H04L 29/12896; H04L 41/22; H04L 43/106; H04L 43/12; H04L 45/00; H04L 61/605; H04L 67/025; H04L 67/12; H04L 67/18; H04L 67/34; H04M 1/6075; H04M 1/66; H04M 1/72569; H04M 1/72577; Y02D 30/70; Y02D 70/1224; Y02D 70/142; Y02D 70/144; Y02D 70/164; Y02D 70/166

See application file for complete search history.

(56) References Cited

U.S. PATENT DOCUMENTS

| | | | | |
|---|---|---|---|---|
| 5,182,555 A * | 1/1993 | Sumner | ............ | G08G 1/096716 340/905 |
| 5,187,810 A * | 2/1993 | Yoneyama | ......... | G01C 21/3492 340/905 |
| 5,508,930 A * | 4/1996 | Smith, Jr. | ......... | G01C 21/3415 340/988 |
| 5,539,645 A * | 7/1996 | Mandhyan | ............ | G08G 1/0104 340/905 |
| 5,732,383 A * | 3/1998 | Foladare | ............ | G08G 1/0104 455/456.5 |
| 5,884,212 A * | 3/1999 | Lion | ............ | G01S 13/92 701/117 |
| 5,889,477 A * | 3/1999 | Fastenrath | ............ | G08G 1/0104 340/905 |
| 5,907,293 A * | 5/1999 | Tognazzini | ............ | H04W 4/40 340/903 |
| 5,933,100 A * | 8/1999 | Golding | ............ | G08G 1/0104 340/995.13 |
| 6,061,625 A * | 5/2000 | Fastenrath | ............ | G08G 1/0104 342/454 |
| 6,092,020 A * | 7/2000 | Fastenrath | ............ | G08G 1/0104 340/992 |
| 6,133,853 A * | 10/2000 | Obradovich | ............ | H04W 4/029 340/905 |
| 6,148,261 A * | 11/2000 | Obradovich | ............ | G01C 21/00 701/438 |
| 6,150,961 A * | 11/2000 | Alewine | ............ | G08G 1/01 340/905 |
| 6,188,315 B1 | 2/2001 | Herbert et al. | | |
| 6,195,609 B1 * | 2/2001 | Pilley | ............ | G01C 23/00 701/120 |
| 6,236,932 B1 * | 5/2001 | Fastenrath | ............ | G08G 1/0104 180/167 |
| 6,236,933 B1 * | 5/2001 | Lang | ............ | G08G 1/0104 340/905 |
| 6,259,377 B1 * | 7/2001 | Noecker | ............ | G08G 1/0112 340/905 |
| 6,304,816 B1 * | 10/2001 | Berstis | ............ | G08G 1/0104 701/117 |
| 6,329,932 B1 * | 12/2001 | Fastenrath | ............ | G08G 1/0104 340/934 |
| 6,333,703 B1 * | 12/2001 | Alewine | ............ | G08G 1/01 340/905 |
| 6,341,255 B1 * | 1/2002 | Lapidot | ............ | G08G 1/0104 340/905 |
| 6,353,795 B1 * | 3/2002 | Ranjan | ............ | G01C 21/3667 340/905 |
| 6,359,571 B1 * | 3/2002 | Endo | ............ | G08G 1/096791 340/988 |
| 6,381,533 B1 * | 4/2002 | Crane | ............ | G01C 21/32 340/988 |
| 6,401,027 B1 * | 6/2002 | Xu | ............ | G08G 1/0104 340/988 |
| 6,405,132 B1 * | 6/2002 | Breed | ............ | G01S 7/4802 701/301 |
| 6,424,910 B1 * | 7/2002 | Ohler | ............ | G01C 21/3438 340/988 |
| 6,426,709 B1 * | 7/2002 | Becker | ............ | G08G 1/0104 340/988 |
| 6,466,862 B1 * | 10/2002 | DeKock et al. | ...... | G08G 1/0104 340/901 |
| 6,480,783 B1 * | 11/2002 | Myr | ............ | G08G 1/096816 701/117 |
| 6,496,709 B2 * | 12/2002 | Murray | ............ | H04W 88/02 455/569.1 |
| 6,505,114 B2 * | 1/2003 | Luciani | ............ | G08G 1/0104 701/117 |
| 6,510,377 B2 * | 1/2003 | Phung | ............ | G08G 1/0104 701/117 |
| 6,522,970 B2 * | 2/2003 | Kerner | ............ | G08G 1/0104 701/117 |
| 6,546,330 B2 * | 4/2003 | Fushiki | ............ | G08G 1/0104 701/118 |
| 6,577,946 B2 * | 6/2003 | Myr | ............ | G08G 1/0104 455/456.5 |
| 6,594,576 B2 * | 7/2003 | Fan | ............ | G01C 21/3492 340/990 |
| 6,615,130 B2 * | 9/2003 | Myr | ............ | G08G 1/096838 701/117 |
| 6,708,085 B2 * | 3/2004 | Yamane | ............ | G08G 1/0104 340/905 |
| 6,708,107 B2 * | 3/2004 | Impson | ............ | G08G 1/096716 340/905 |
| 6,711,493 B1 * | 3/2004 | Andrews | ............ | G08G 1/0104 340/903 |
| 6,791,472 B1 * | 9/2004 | Hoffberg | ............ | H04B 7/18576 340/539.17 |
| 6,810,321 B1 * | 10/2004 | Cook | ............ | G08G 1/0104 340/905 |
| 6,847,889 B2 * | 1/2005 | Park | ............ | G08G 1/096811 701/420 |
| 6,865,475 B2 * | 3/2005 | Willenbrock | ........ | G08G 1/0104 701/117 |

(56) References Cited

U.S. PATENT DOCUMENTS

| | | | | |
|---|---|---|---|---|
| 7,010,289 B2* | 3/2006 | Jijina | G01C 21/26 | 455/412.1 |
| 7,020,556 B2* | 3/2006 | Kim | G08G 1/096775 | 701/454 |
| 7,047,130 B2* | 5/2006 | Watanabe | G08G 1/0104 | 701/117 |
| 7,069,017 B2* | 6/2006 | Lee | H04W 4/029 | 455/456.1 |
| 7,116,326 B2* | 10/2006 | Soulchin | G06T 13/80 | 345/440 |
| 7,188,025 B2 | 3/2007 | Hudson | | |
| 7,228,224 B1* | 6/2007 | Rosen | G08G 1/20 | 340/905 |
| 7,260,472 B2* | 8/2007 | Sutardja | G08G 1/0104 | 340/932.2 |
| 7,292,934 B2* | 11/2007 | Wolf | G01C 21/26 | 701/117 |
| 7,343,242 B2* | 3/2008 | Breitenberger | G08G 1/0104 | 340/905 |
| 7,353,107 B2* | 4/2008 | Breitenberger | G07C 5/008 | 340/995.13 |
| 7,433,889 B1* | 10/2008 | Barton | G08G 1/20 | |
| 7,499,949 B2* | 3/2009 | Barton | G08G 1/0104 | |
| 7,522,940 B2* | 4/2009 | Jendbro | H04W 64/00 | 342/357.31 |
| 7,577,441 B2 | 8/2009 | Nonoyama | | |
| 7,650,227 B2* | 1/2010 | Kirk | G08G 1/0104 | 701/117 |
| 7,672,775 B2* | 3/2010 | Ishikawa | G08G 1/096775 | 701/119 |
| 7,912,627 B2* | 3/2011 | Downs | G08G 1/0133 | 701/117 |
| 7,912,628 B2* | 3/2011 | Chapman | G08G 1/0141 | 701/117 |
| 8,009,659 B2* | 8/2011 | Kim | G08G 1/0969 | 370/349 |
| 8,014,936 B2* | 9/2011 | Chapman | G08G 1/0129 | 701/117 |
| 8,306,556 B2* | 11/2012 | Chao | G08G 1/0104 | 455/457 |
| 8,718,928 B2* | 5/2014 | Relyea | G08G 1/0141 | 701/414 |
| 9,418,544 B2* | 8/2016 | Relyea | G08G 1/0104 | |
| 9,711,044 B2* | 7/2017 | Relyea | H04W 4/027 | |
| 10,373,488 B2* | 8/2019 | Relyea | G08G 1/09626 | |
| 2001/0001848 A1* | 5/2001 | Oshizawa | G01C 21/3691 | 701/414 |
| 2002/0030611 A1 | 3/2002 | Nuesser et al. | | |
| 2002/0082766 A1* | 6/2002 | Ormson | G08G 1/0104 | 701/117 |
| 2003/0125845 A1 | 7/2003 | Carlstedt et al. | | |
| 2003/0187570 A1 | 10/2003 | Impson et al. | | |
| 2004/0039516 A1* | 2/2004 | Willembrock | G08G 1/0104 | 701/117 |
| 2004/0102893 A1 | 5/2004 | Atkinson et al. | | |
| 2005/0125143 A1* | 6/2005 | Beesley | G08G 1/096811 | 701/532 |
| 2005/0137781 A1 | 6/2005 | Hudson | | |
| 2006/0106530 A1 | 5/2006 | Horvitz et al. | | |
| 2007/0038360 A1* | 2/2007 | Sakhpara | G08G 1/09675 | 701/117 |
| 2007/0088490 A1 | 4/2007 | Sutardja | | |
| 2007/0189181 A1 | 8/2007 | Kirk et al. | | |
| 2007/0208495 A1* | 9/2007 | Chapman | G08G 1/0112 | 701/117 |
| 2007/0208496 A1* | 9/2007 | Downs | G08G 1/0112 | 701/117 |
| 2007/0226227 A1 | 9/2007 | Helfman | | |
| 2008/0025331 A1 | 1/2008 | Tabata et al. | | |
| 2008/0045234 A1 | 2/2008 | Reed | | |
| 2008/0071465 A1* | 3/2008 | Chapman | G01C 21/3691 | 701/117 |
| 2009/0234574 A1 | 9/2009 | Deng et al. | | |
| 2009/0271101 A1* | 10/2009 | Relyea | H04W 4/50 | 701/118 |
| 2014/0244149 A1* | 8/2014 | Relyea | H04W 4/027 | 701/118 |
| 2014/0314299 A1* | 10/2014 | Santamaria-Pang | G06K 9/0014 | 382/133 |
| 2016/0123276 A1 | 5/2016 | Tsujino | F02M 21/0245 | 137/565.16 |
| 2016/0307442 A1* | 10/2016 | Relyea | G08G 1/0129 | |
| 2017/0249835 A1* | 8/2017 | Relyea | G08G 1/096775 | |
| 2019/0304295 A1* | 10/2019 | Relyea | G08G 1/056 | |

* cited by examiner

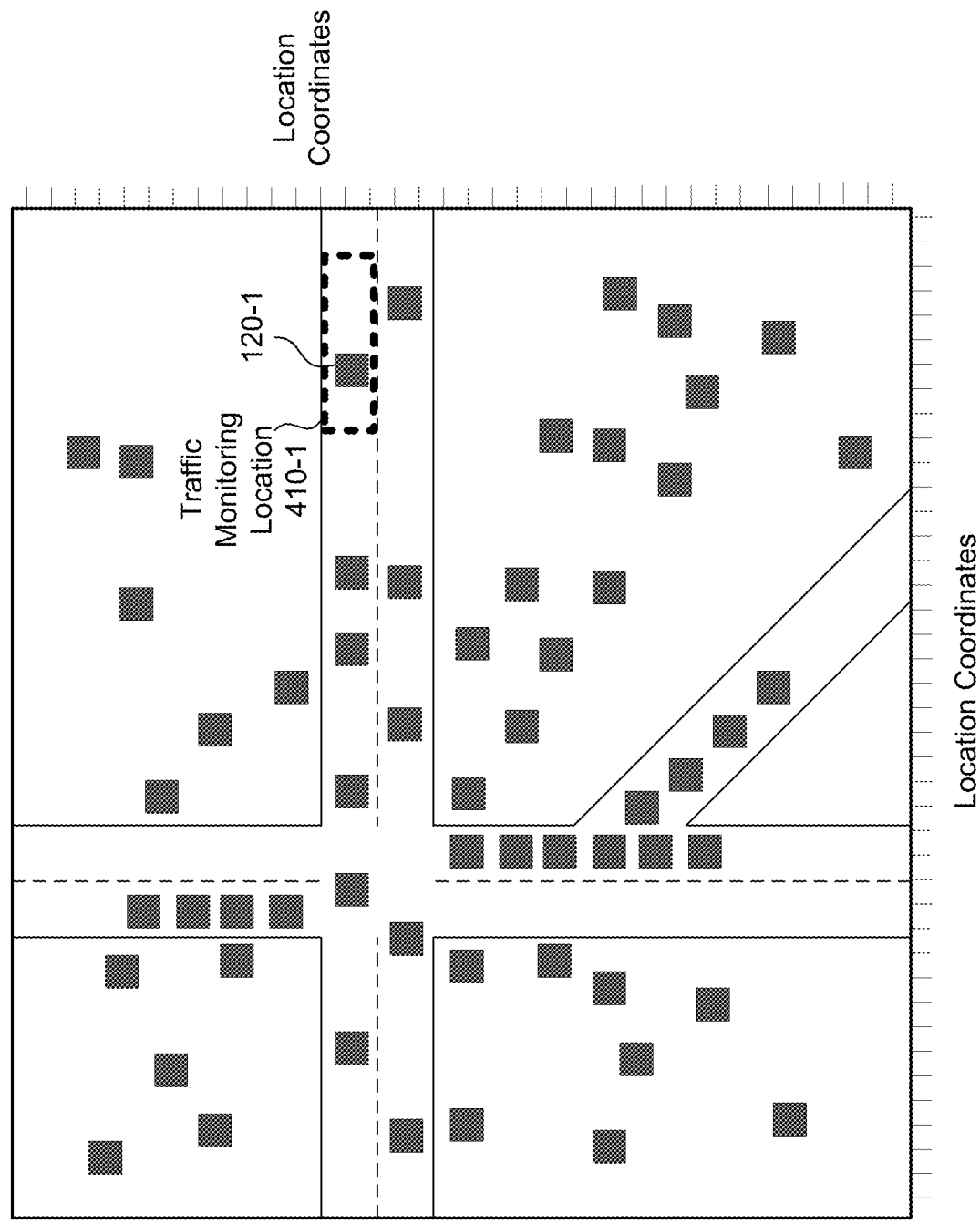

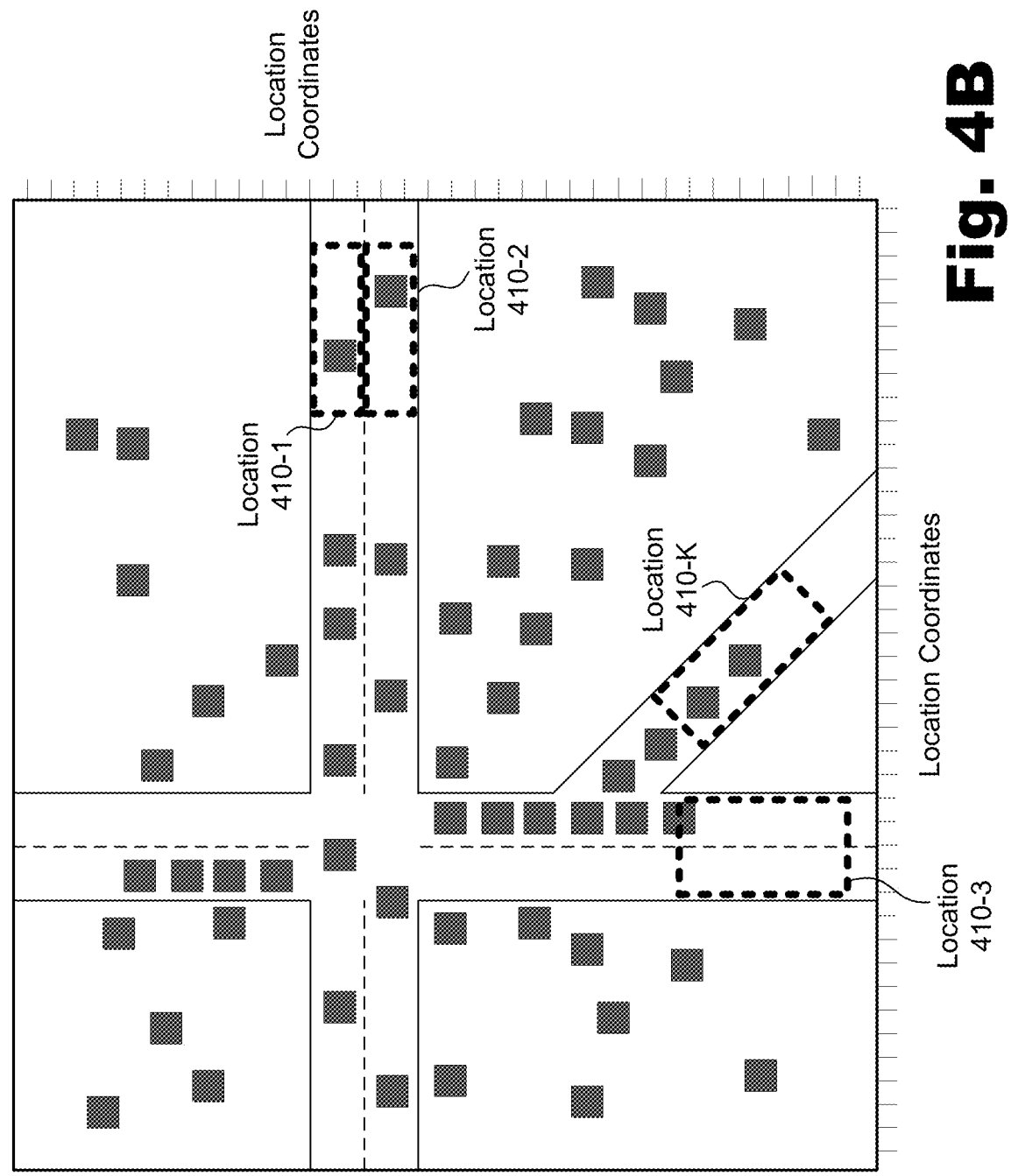

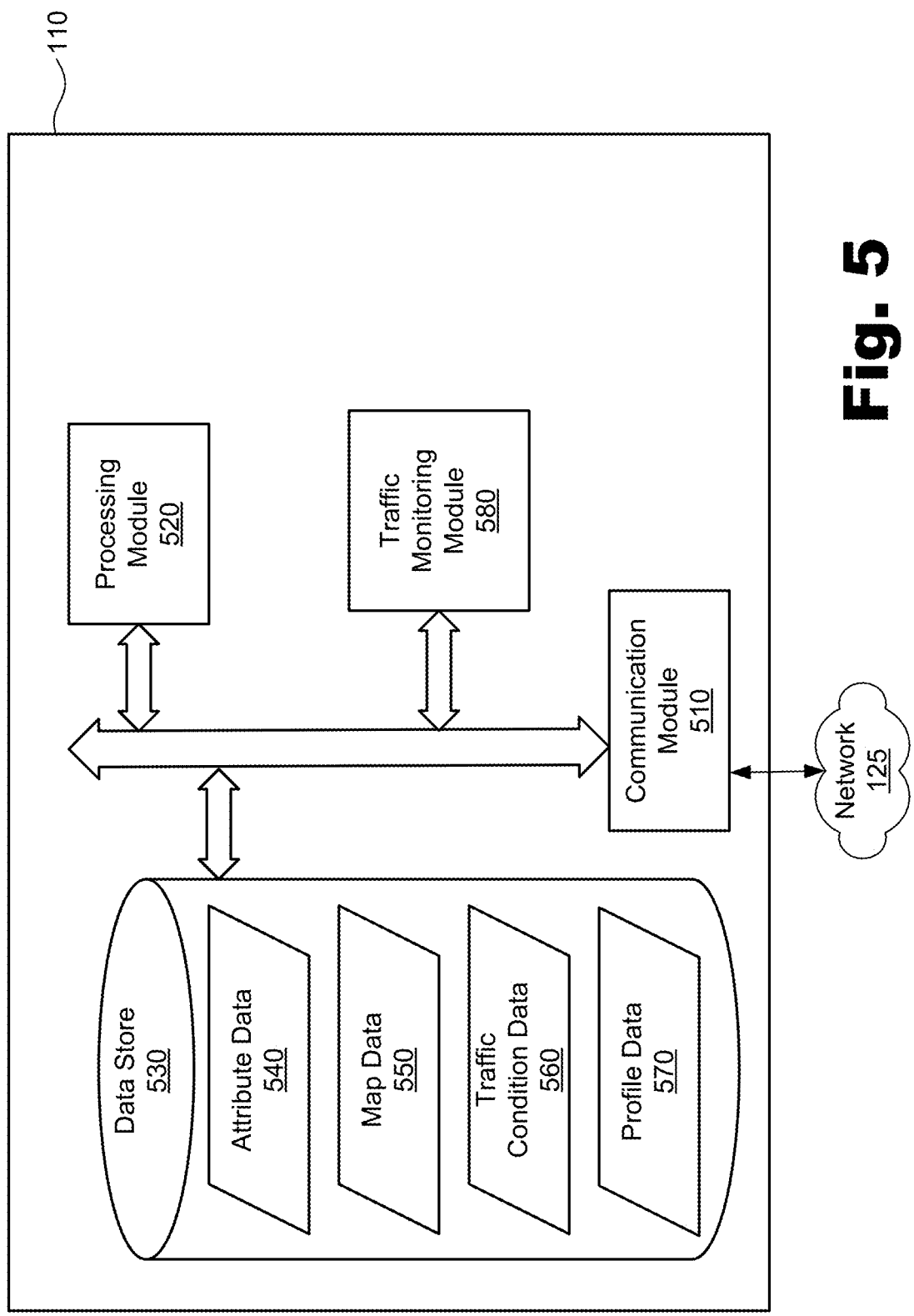

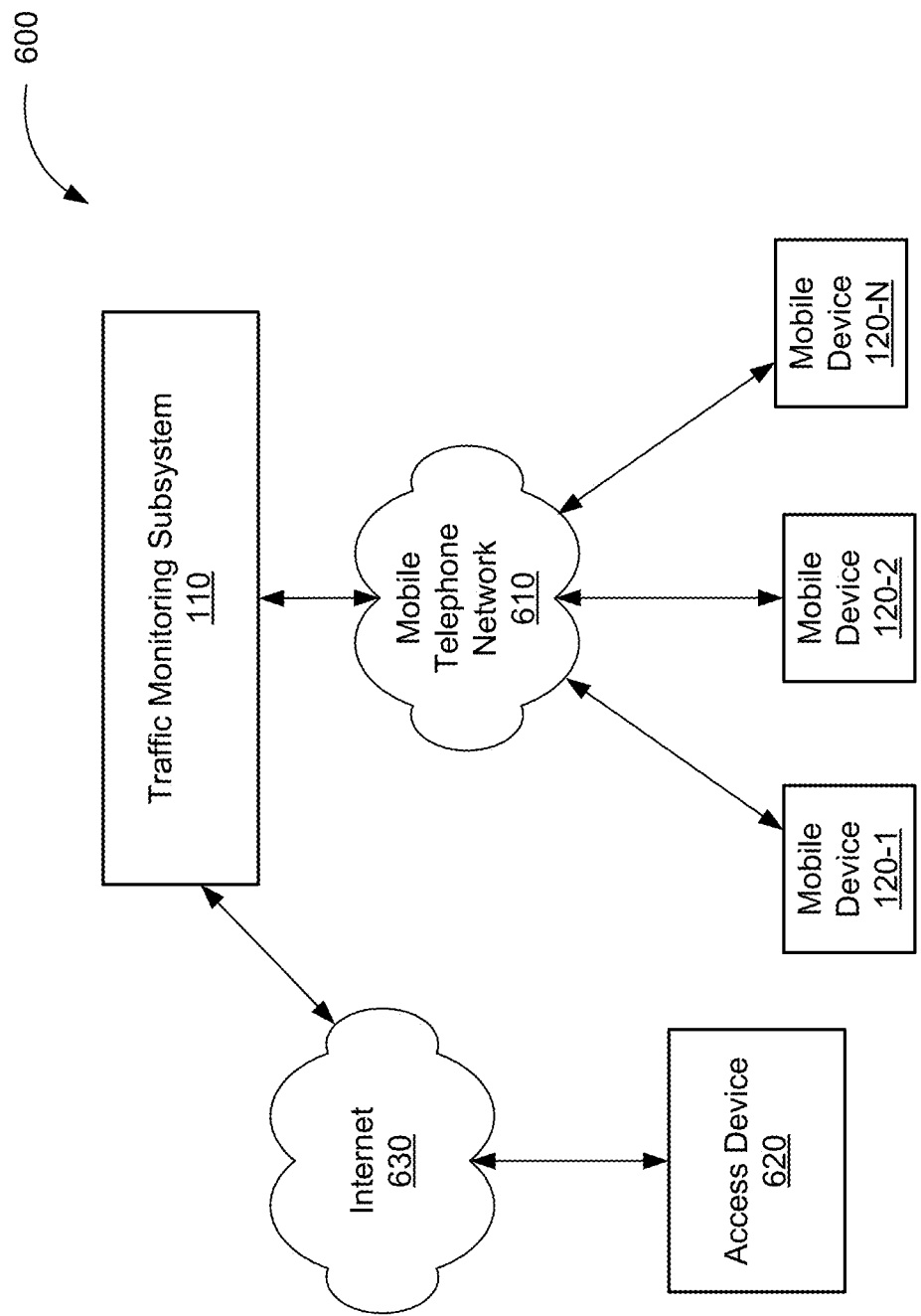

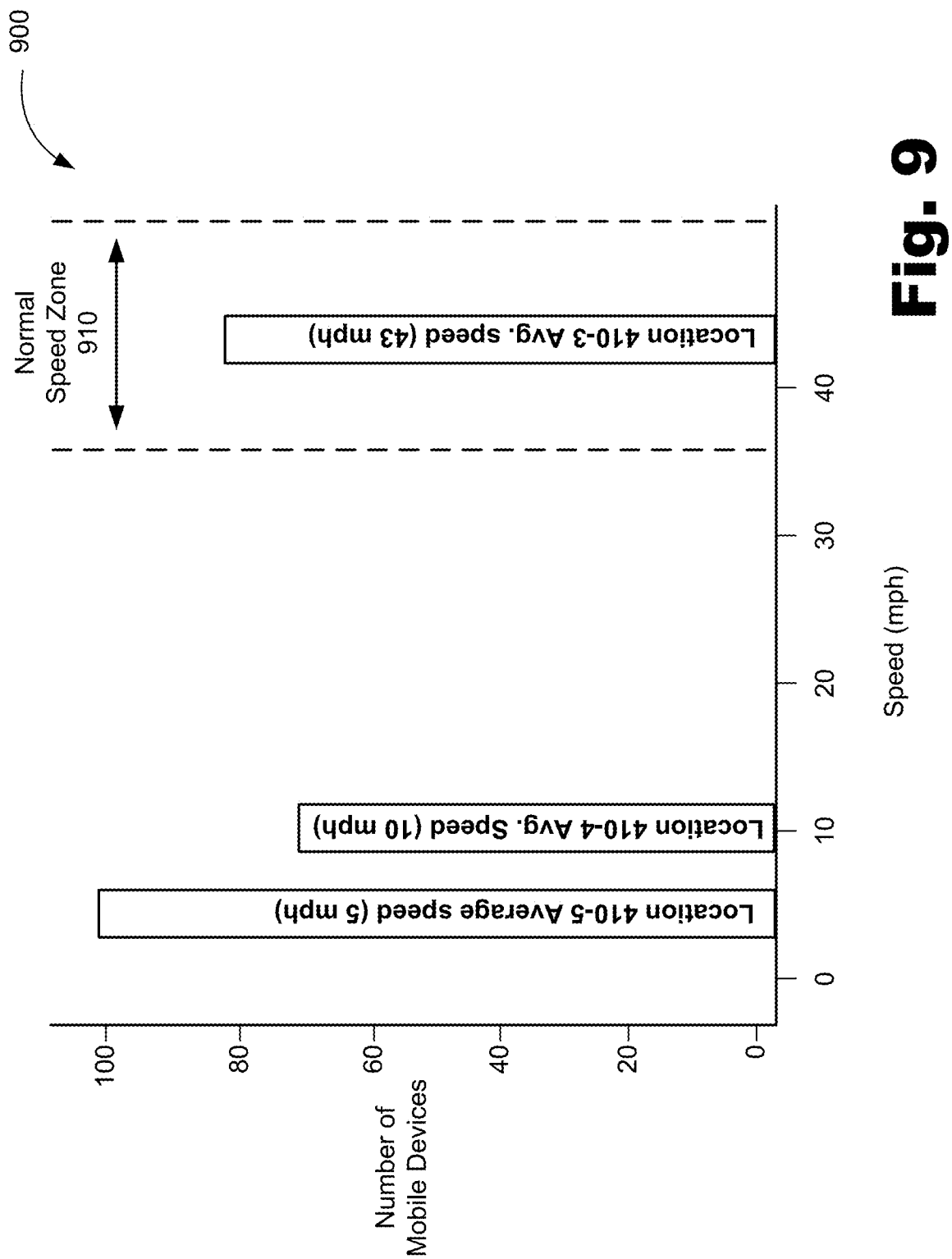

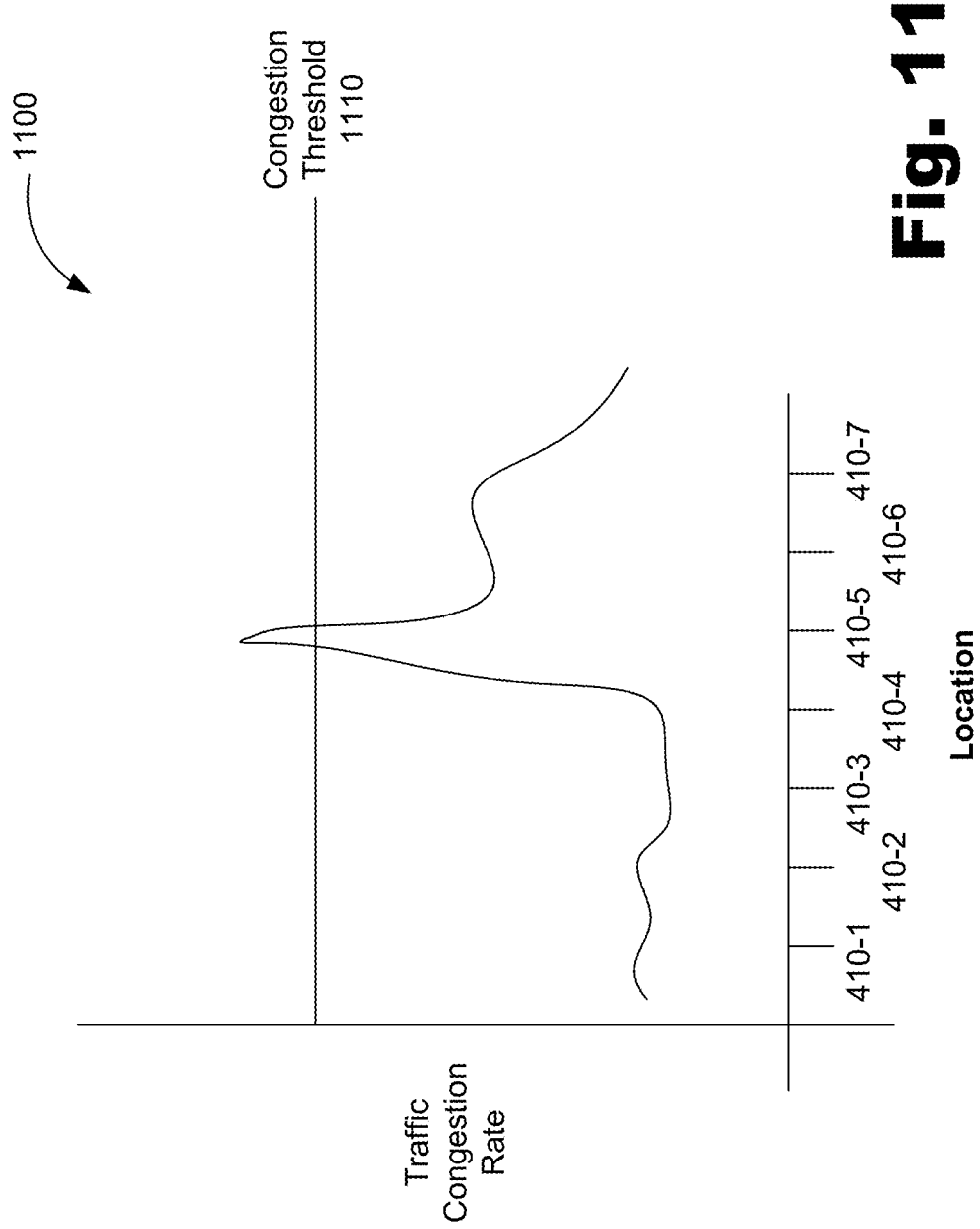

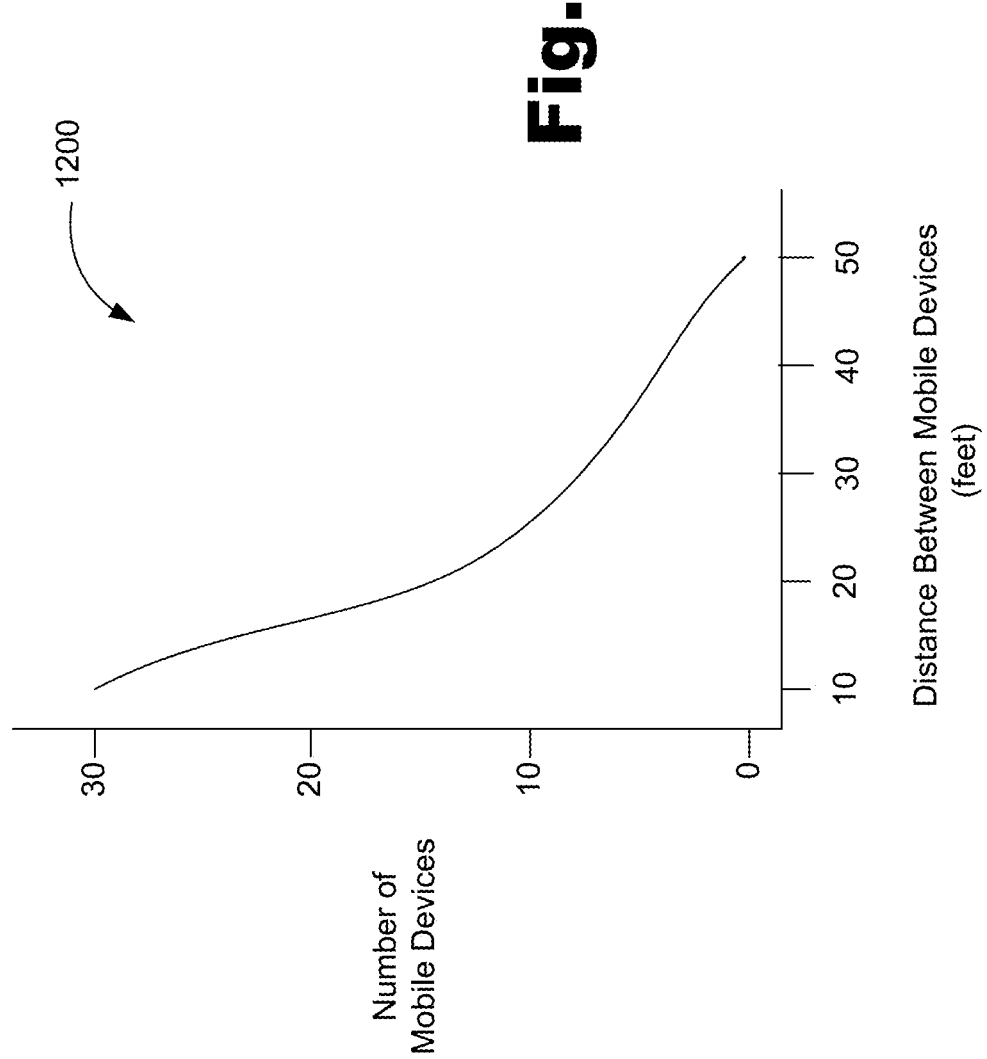

TRAFFIC MONITORING SYSTEMS AND METHODS

RELATED APPLICATIONS

The present application is a continuation application of U.S. patent application Ser. No. 15/597,047, filed on May 16, 2017, which application is a continuation application of U.S. patent application Ser. No. 15/197,562, filed on Jun. 29, 2016 and issued on Jul. 18, 2017 as U.S. Pat. No. 9,711,044, which application is a continuation application of U.S. patent application Ser. No. 14/270,128, filed on May 5, 2014 and issued on Aug. 16, 2016 as U.S. Pat. No. 9,418,544, which application is a continuation application of U.S. patent application Ser. No. 12/108,247, filed Apr. 23, 2008 and issued on May 6, 2014 as U.S. Pat. No. 8,718,928. These applications are hereby incorporated by reference in their entirety.

BACKGROUND INFORMATION

The automobile is an important transportation tool in modern society. As the number of automobiles in operation has increased, traffic has become a significant issue that routinely affects people's schedules, travels, and travel plans. For example, people commuting to and from the workplace frequently experience delays due to traffic congestion and/or automobile collisions. It is not uncommon for such delays to be lengthy and to waste significant resources.

Consequently, traffic reports and other distributions of traffic-related information have become commonplace in many locations. For example, certain radio stations incorporate periodic traffic reports into their programming. Such traffic reports typically involve one or more reporters describing traffic conditions as they see them or are based on second-hand information. However, traffic reports broadcast over the radio are often of a generic nature and may not cover traffic conditions affecting routes traveled by certain people. Moreover, a person must typically listen to other programming provided by a radio station while waiting for a traffic report to be broadcast.

Traffic information is also distributed over the Internet. However, the usefulness and accuracy of such traffic information may be limited and/or questionable. For example, such traffic information is typically delayed in time and may not accurately represent current traffic conditions.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 4A-4B illustrate a map view of an exemplary geographic area having mobile devices included therein and one or more exemplary traffic monitoring locations defined therein.

FIG. 5 illustrates an exemplary traffic monitoring subsystem that may be included in the system of FIG. 1.

FIG. 6 illustrates another exemplary traffic monitoring system.

FIG. 9 is a graph of exemplary traffic condition data and in which a number of mobile devices is plotted against speed of the mobile devices.

FIG. 11 is a graph of exemplary traffic congestion rates plotted against traffic monitoring locations.

FIG. 12 is a graph of a number of mobile devices plotted against distance between the mobile devices.

DETAILED DESCRIPTION OF PREFERRED EMBODIMENTS

Exemplary traffic monitoring systems and methods are described herein. In an exemplary method, mobile device attribute data is received from a plurality of mobile devices over a network. The mobile device attribute data includes location data representative of a plurality of geographic locations associated with the mobile devices. The method further includes selectively aggregating the mobile device attribute data and generating traffic condition data based at least in part on the mobile device attribute data. The generated traffic condition data is representative of at least one traffic condition (e.g., a street traffic condition such as one or more traffic congestion rates along a street). In certain embodiments, the mobile devices include mobile telephones and the network includes a mobile telephone network. In certain embodiments, the traffic condition data is real time data. In certain embodiments, at least a portion of the traffic condition data is may be accessed by one or more of the mobile devices over the network.

Exemplary embodiments of traffic monitoring systems and methods will now be described in more detail with reference to the accompanying drawings.

Figure 1:
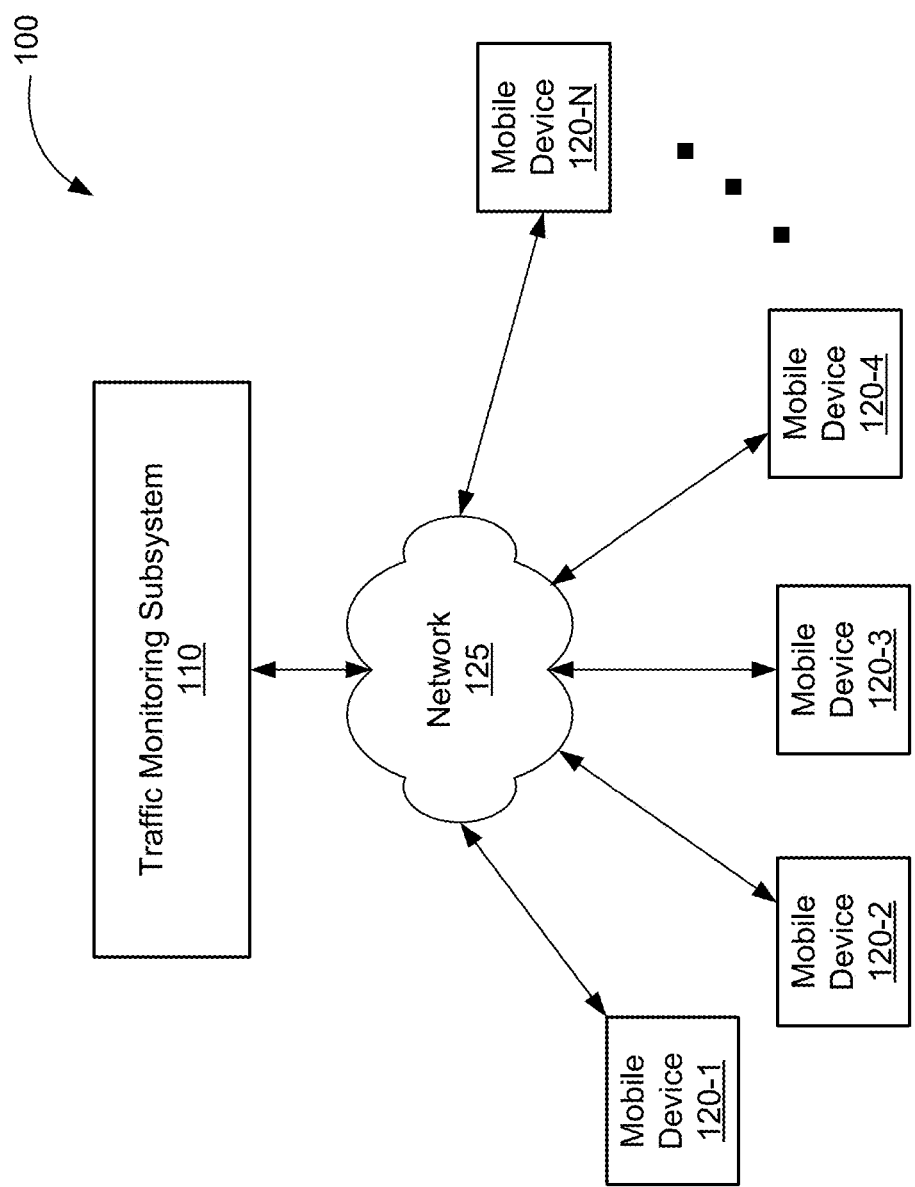
FIG. 1 illustrates an exemplary traffic monitoring system.

FIG. 1 illustrates an exemplary traffic monitoring system 100 (or simply "system 100"). As shown in FIG. 1, system 100 may include a traffic monitoring subsystem 110 selectively and communicatively connected to a plurality of mobile devices 120-1 through 120-N (collectively "mobile devices 120") by way of a network 125.

The mobile devices 120 and the traffic monitoring subsystem 110 may communicate over network 125 using any communication platforms and technologies suitable for transporting data and/or communication signals, including known communication technologies, devices, media, and protocols supportive of remote data communications, examples of which include, but are not limited to, data transmission media, mobile communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, in-band and out-of-band signaling technologies, and other suitable communications networks and technologies.

Network 125 may include one or more networks, including, but not limited to, wireless networks, (e.g., wireless communication networks), mobile telephone networks (e.g., cellular telephone networks), closed media networks, open media networks, closed communication networks, open communication networks, satellite networks, navigation networks, broadband networks, narrowband networks, voice communications networks, the Internet, and any other networks capable of carrying data representative of data and/or communications signals between mobile devices 120 and traffic monitoring subsystem 110. Communications between the traffic monitoring subsystem 110 and the mobile devices 120 may be transported using any one of above-listed networks, or any combination or sub-combination of the above-listed networks. In certain exemplary embodiments, network 125 includes a mobile telephone network.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of well known computing devices, and may employ any of a number of well known computer operating systems, including, but by no means limited to, known versions and/or varieties of Microsoft Windows, UNIX, Macintosh, and Linux operating systems.

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Mobile devices 120 may be associated with users, which in certain embodiments may be subscribers to or users of one or more services (e.g., a wireless telephone service and/or a traffic monitoring service) provided over network 125. As described further below, system 100 may maintain user profiles for users of mobile devices 120 and utilize the user profiles to provide individual traffic monitoring services and/or data.

Mobile device 120 may include any device configured to perform one or more of the mobile device operations described herein, including communicating with traffic monitoring subsystem 110 by way of network 125. Mobile device 120 may include, but is not limited to, a wireless computing device, a wireless communication device (e.g., a mobile telephone configured to access one or more services provided over network 125), a portable computing device (e.g., a laptop computer), a portable communication device, a personal digital assistant, a vehicular computing and/or communication device, a vehicle (e.g., an automobile), a portable navigation device, a Global Positioning System ("GPS") device, and/or any other mobile device configured to perform one or more of the mobile device operations described herein.

Figure 2:
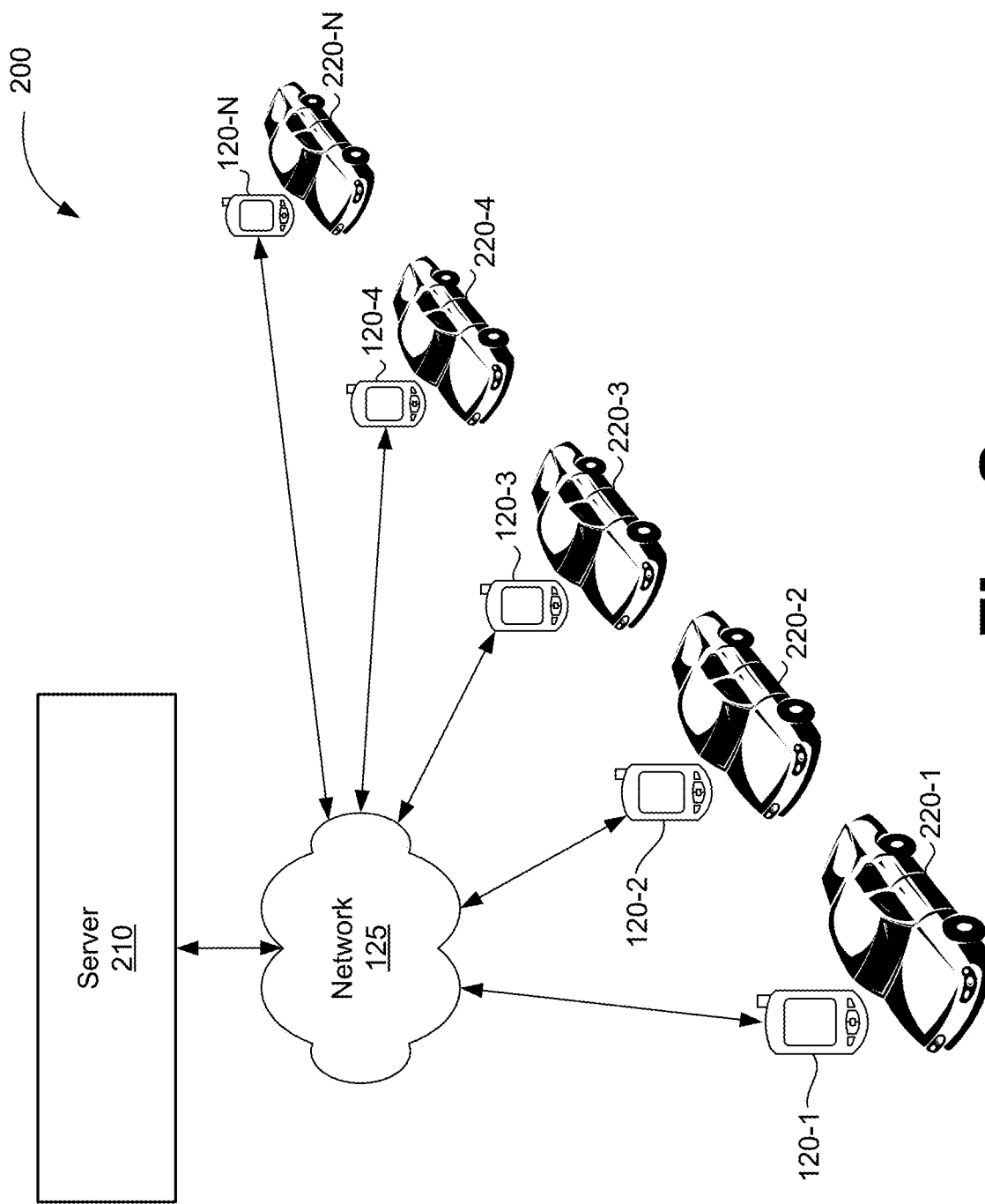
FIG. 2 illustrates an exemplary implementation of the traffic monitoring system of FIG. 1.

FIG. 2 illustrates an exemplary implementation 200 of system 100. In implementation 200, traffic monitoring subsystem 110 may include or be implemented in at least one server 210 configured to communicate with mobile devices 120 by way of network 125. In implementation 200, network 125 includes a mobile telephone network and mobile devices 120 include mobile telephones configured to communicate with traffic monitoring subsystem 110 by way of network 125.

Many users carry their mobile devices 120, such as mobile telephones, wherever they go. For example, many users keep their mobile devices 120 with them while riding in an automobile or other vehicle. FIG. 2 illustrates vehicles 220-1 through 220-N (collectively "vehicles 220") in which mobile devices 120 may be transported. A mobile device 120 being transported in a vehicle 120 may provide data descriptive of one or more attributes of the mobile device 120, including data descriptive of the geographic location and/or movement of the mobile device 120 at a given time and/or over a certain time period. Such data may be indicative of one or more traffic conditions.

As described in more detail further below, mobile devices 120 being transported within one or more vehicles 220 may provide mobile device attribute data to traffic monitoring subsystem 110, which may be configured to selectively aggregate the attribute data and to generate traffic condition data based on the attribute data. Traffic monitoring subsystem 110 may make the traffic condition data available over network 125, including to one or more of the mobile devices 120 over network 125. Mobile devices 120 may be configured to present the traffic condition data to one or more users of the mobile devices 120. Accordingly, a user of a mobile device 120 may be provided with access to accurate and current traffic condition data. In certain embodiments, the traffic condition data is presented in real time.

Figure 3:
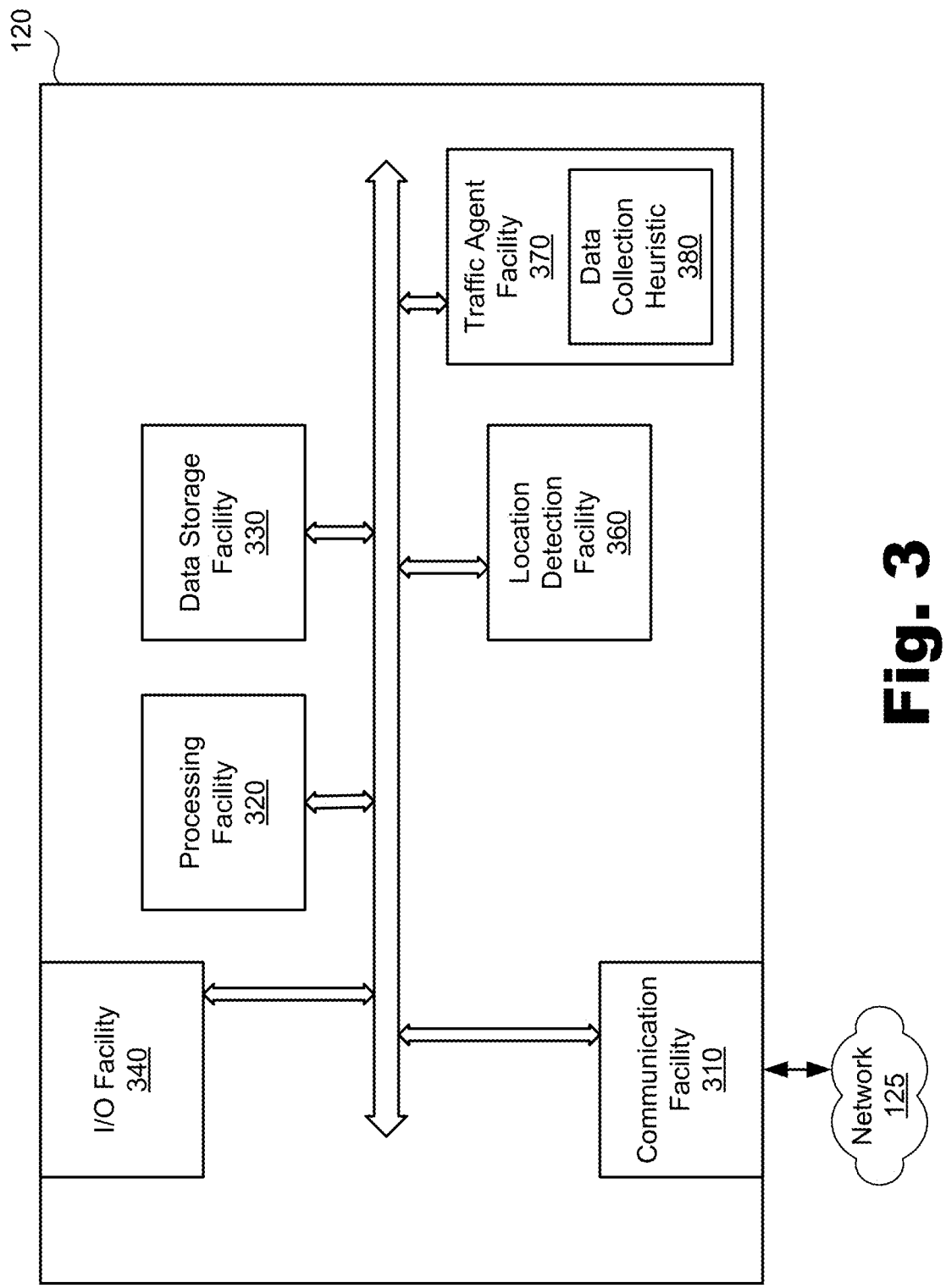
FIG. 3 illustrates an exemplary mobile device that may be used in the system of FIG. 1.

FIG. 3 illustrates components of an exemplary mobile device 120. As shown in FIG. 3, mobile device 120 may include a communication facility 310, processing facility 320, data storage facility 330, input/output ("I/O") facility 340, location detection facility 360, and traffic agent facility 370 communicatively connected to one another. The facilities 310-370 may be communicatively connected using any suitable technologies. Each of the facilities 310-370 may be implemented as hardware, as computing instructions (e.g., software) tangibly embodied on a computer-readable medium, or as a combination of hardware and computing instructions configured to perform one or more of the processes described herein. In certain embodiments, for example, traffic agent facility 370 may be implemented as a software application embodied on a computer-readable medium such as data storage facility 330 and configured to direct the mobile device 120 (e.g., processing facility 320 of the mobile device 120) to execute one or more of the processes described herein.

Communication facility 310 may be configured to send and receive communications over network 125, including sending and receiving data and/or communication signals to/from traffic monitoring subsystem 110. Communication facility 310 may include any device, logic, and/or other technologies suitable for transmitting and receiving data and/or communication signals. In certain embodiments, communication facility 310 may be configured to support other network service communications over network 125, including wireless voice, data, and messaging communications. The communication facility 310 may be configured to interface with any suitable communication media, protocols, formats, platforms, and networks, including any of those mentioned herein.

Processing facility 320 may be configured to control operations of one or more components of the mobile device 120. Processing facility 320 may execute or direct execution of operations in accordance with computer-executable instructions such as may be stored in data storage facility 330 or other computer-readable medium. As an example, processing facility 320 may be configured to process data, including demodulating, decoding, and parsing received data, and encoding and modulating data for transmission to traffic monitoring subsystem 110.

Data storage facility 330 may include one or more data storage media, devices, or configurations and may employ any type, form, and combination of storage media. For example, the data storage facility 330 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of one or more attributes of the mobile device 120 (i.e., mobile device attribute data such as geographic location of the mobile device 120), may be temporarily and/or permanently stored in the data storage facility 330.

I/O facility 340 may be configured to receive user input and provide user output and may include any hardware, firmware, software, or combination thereof supportive of input and output capabilities. For example, I/O facility 340 may include one or more devices for receiving input from a user, including, but not limited to, a microphone, keyboard, keypad, touch screen component, and signal receiver (e.g., an RF or infrared receiver).

I/O facility 340 may include one or more devices for presenting data to a user, including, but not limited to, a graphics engine, a display, display drivers, one or more audio speakers, one or more audio drivers, and one or more audio data converters (e.g., data to speech converters). Accordingly, I/O facility 340 may present data such as traffic condition data and/or related data to the user. I/O facility 340 may also be configured to provide other output to the user 130, including providing notifications of the detected existence of one or more predefined traffic conditions, as described further below.

Location detection facility 360 may include any hardware, computing instructions (e.g., software), or combination thereof configured to detect a geographic location of the mobile device 120. In some embodiments, the location detection facility 360 may be configured to utilize GPS technologies to determine the geographic location of the mobile device 120, which location may be identified in terms of GPS coordinates. Other suitable location detection technologies may be used in other embodiments, including using principles of trilateration to evaluate radio frequency signals received by the mobile device 120 (e.g., RF signals in a wireless phone network) and to estimate the geographic location of the mobile device 120.

Location detection facility 360 may be configured to detect the geographic location of a mobile device 120 periodically at a predetermined frequency or time, or in response to a predetermined trigger event. Such a trigger event may include, but is not limited to, receipt of an instruction to detect the current geographic location of the mobile device 120. As an example, traffic agent facility 370 may be configured to instruct the location detection facility 360 when to determine the geographic location of the mobile device 120.

In certain embodiments, location detection facility 360 may be configured to continually detect the geographic location of mobile device 120 (i.e., location detection facility 360 may be configured to be "always on"). In such embodiments, location detection facility 360 may continually detect the location of the mobile device 120 at a predefined frequency (e.g., every one or two seconds).

Once location detection facility 360 has detected the geographic location of the mobile device 120, the location detection facility 360 may generate and provide location data (e.g., GPS coordinates) representative of the detected geographic location of the mobile device 120. The location data may be provided to data storage facility 330 for storage and/or to traffic agent facility 370 for further processing (e.g., filtering).

Mobile device 120 may be configured to identify and associate time data with the location data. For example, location detection facility 360, traffic agent facility 370, or another component of the mobile device 120 may be configured to identify a time at which the location detection facility 360 detects the geographic location of the mobile device 120. The location detection facility 360, traffic agent facility 370, or another component of the mobile device 120 may be configured to associate the time data with the location data. Location data and/or associated time data may be provided to or otherwise accessed by traffic agent facility 370.

Traffic agent facility 370 may be configured to control when and/or what data is provided to the traffic monitoring subsystem 110. For example, location detection facility 360 may be "turned on" and may continually detect the geographic location of the mobile device 120 as described above. The resultant location data may be provided to the traffic agent facility 370, which may be configured to filter the location data and selectively determine which instances of the location data will be provided to the traffic monitoring subsystem 110. In certain embodiments, traffic agent facility 370 may include a predefined or customizable data collection heuristic 380 defining one or more conditions to be used to identify location data as being "relevant" or "not relevant" to traffic monitoring purposes. Location data determined to be "relevant" may be provided to the traffic monitoring subsystem 110, while location data that is determined to be "not relevant" is not provided to the traffic monitoring subsystem 110. Conditions for determining relevancy or irrelevancy of location data may be defined as may suit a particular implementation.

To facilitate an understanding of a mobile device 120 detecting, filtering, and providing location data that is "relevant" to traffic monitoring purposes, FIG. 4A illustrates a map view 400 of an exemplary geographic area. In the example shown, map view 400 includes a street map view. The square shapes shown in FIG. 4 represent mobile devices 120 located within the geographic area. As described above, each of the mobile devices 120 may be configured to detect its own geographic location and to determine whether the resultant location data is "relevant" for traffic monitoring.

FIG. 4A illustrates an exemplary traffic monitoring location 410-1, which may be defined in advance to indicate one or more geographic locations that are considered "relevant" for traffic monitoring. When the geographic location of a mobile device 120 is determined to not be within traffic monitoring location 410-1, traffic agent facility 370 may ignore, for purposes of traffic monitoring, the location data associated with the mobile device 120. In other words, traffic monitoring agent 370 may filter out the location data such that the irrelevant location data is not provided to the traffic monitoring subsystem 110. When the geographic location of a mobile device 120 is determined to be within traffic monitoring location 410-1, traffic agent facility 370 may provide the location data to the traffic monitoring subsystem 110. In the example shown in FIG. 4A, traffic agent facility 370 may provide the traffic monitoring subsystem 110 with location data associated with mobile device 120-1 located in traffic monitoring location 410-1 but not for the other mobile devices 120 located outside of traffic monitoring location 410-1. Hence, when a mobile device 120 moves within traffic monitoring location 410-1, the location data for the mobile device 120 will become "relevant" and be provided to the traffic monitoring subsystem 110. When a mobile device 120 moves outside of traffic monitoring location 410-1, the location data for the mobile device 120 will no longer be considered "relevant" and will not be provided to the traffic monitoring subsystem 110.

The data collection heuristic 380 may be defined to specify conditions for determining whether location data is "relevant" or "not relevant" to traffic monitoring purposes. For example, the data collection heuristic 380 may be defined to include data indicative of the traffic monitoring location 410-1. Accordingly, traffic agent facility 370 may be configured to identify location data that matches (e.g., is located within) traffic monitoring location 410-1 as defined in the data collection heuristic 380. Identification of matching location data may be performed in any suitable way, including comparing detected location coordinates with location coordinates and/or geographic areas defined in the data collection heuristic 380.

Traffic monitoring location 410-1 may be defined in any suitable way. For example, traffic monitoring location 410-1 may be defined as a set of one or more geographic location coordinates (e.g. GPS coordinates). For instance, traffic monitoring location 410-1 may be defined as a set of location coordinates corresponding with a particular geographic area, such as the exemplary geographic area within traffic monitoring location 410-1 as illustrated in FIG. 4A. As another example, traffic monitoring location 410-1 may be defined as one or more ranges of geographic location coordinates, or as an area or volume defined by certain location coordinates (e.g., a rectangle defined by four corner location points). As yet another example, traffic monitoring location 410-1 may be defined to include a particular location point (e.g., a location defined by GPS coordinates) and an area or volume that is located within a predetermined distance of the location point. For instance, a traffic monitoring location may be defined to include a location point and a generally circular area that is located within a predetermined radius of the location point.

While FIG. 4A illustrates an exemplary traffic monitoring location 410-1, this is illustrative only. Other traffic monitoring locations may be defined as may suit a particular implementation. FIG. 4B illustrates multiple traffic monitoring locations 410-1 through 410-K (collectively "traffic monitoring locations 410) in map view 400 and as may be defined by the data collection heuristic 380.

Mobile device 120 may receive data representative of the data collection heuristic 380 from traffic monitoring subsystem 110. Traffic agent facility 370 may be configured to implement and use the data collection heuristic 380 to selectively collect and/or provide mobile device attribute data (e.g., mobile device location data) to traffic monitoring subsystem 110. Accordingly, traffic monitoring subsystem 110 may define one or more traffic monitoring locations and provide data representative of the traffic monitoring locations to the mobile devices 120 such that the mobile devices 120 may identify and provide "relevant" mobile device attribute data to the traffic monitoring subsystem 110 based on the data collection heuristic 380.

Mobile device 120 may receive one or more updates to the data collection heuristic 380 from traffic monitoring subsystem 110. Traffic agent facility 370 may be configured to implement the updates in the data collection heuristic 380. For example, traffic monitoring subsystem 110 may provide an update to add, delete, or modify one or more traffic monitoring locations 410. Accordingly, one or more traffic monitoring locations 410 may be adjusted dynamically as may suit a particular implementation and/or based on detected traffic conditions. For example, if traffic monitoring subsystem 110 determines that a particular traffic condition (e.g., traffic congestion and/or delay exceeding a predetermined threshold) exists within a traffic monitoring location 410-1, traffic monitoring subsystem 110 may provide an update configured to modify the data collection heuristic 380 in mobile device 120 to focus (e.g., collect additional data) on the detected traffic condition. For instance, an update may be configured to expand the area of traffic monitoring location 410-1 such that additional location data may be considered relevant. This may be especially helpful for tracking a traffic condition such as congestion that grows to extend beyond an original traffic monitoring location 410-1. As another example, data collection heuristic 380 may be updated to direct more frequent collection and reporting of mobile device attribute data associated with traffic monitoring location 410-1. In this or similar manner, traffic monitoring subsystem 110 may dynamically adjust parameters of data collection based on one or more detected traffic conditions.

As mentioned, mobile device attribute data may include data descriptive of one or more attributes of a mobile device 120. Examples of mobile device attribute data include, but are not limited to, mobile device location data, time data associated with the location data, speed data, velocity data, directional heading data, communication signal strength data, and acceleration data. In certain embodiments, speed, velocity, directional heading, and/or acceleration data may be derived from location and time data associated with the mobile device 120.

In certain embodiments, mobile devices 120 may be configured to generate and provide such derivative data (e.g., mobile device speed data) to traffic monitoring subsystem 110 as part of mobile device attribute data. In other embodiments, mobile devices 120 may provide location and associated time data to traffic monitoring subsystem 110, which may be configured to compute derivative data based on the location and time data.

While FIG. 5 illustrates exemplary components of a mobile device 120, this is illustrative only. Components may be added, omitted, and/or modified in other embodiments. In certain embodiments, for example, traffic agent facility 370 may be omitted. In such embodiments, mobile device 120 may detect and provide location and associated time data to traffic monitoring subsystem 110, which may be configured to identify such data as being "relevant" or "not relevant" for traffic monitoring purposes in any of the ways described above.

Mobile device 120 may provide mobile device attribute data to traffic monitoring subsystem 110 by way of network 125. This may be accomplished in any suitable way, including mobile device 120 pushing the mobile device attribute data to the traffic monitoring subsystem 110 and/or the traffic monitoring subsystem requesting the mobile device attribute data from the mobile device 120.

Traffic monitoring subsystem 110 may be configured to receive mobile device attribute data from one or more of the mobile devices 120, selectively aggregate the mobile device attribute data, and generate traffic condition data based on the attribute data. The traffic monitoring subsystem 110 may provide traffic condition data over network 125, including to one or more of the mobile devices 120. Components and functions of an exemplary traffic monitoring subsystem 110 will now be described in more detail.

FIG. 5 illustrates exemplary components of traffic monitoring subsystem 110. The components of traffic monitoring subsystem 110 may include or be implemented as hardware, computing instructions (e.g., software) embodied on a computer-readable medium, or a combination thereof. In certain embodiments, for example, one or more components of traffic monitoring subsystem 110 may include or be implemented on one or more servers (e.g., an application server, content server, messaging server, and/or web server) configured to communicate over network 125. While an exemplary traffic monitoring subsystem 110 is shown in FIG. 5, the exemplary components illustrated in FIG. 5 are not intended to be limiting. Indeed, additional or alternative components and/or implementations may be used.

As shown in FIG. 5, traffic monitoring subsystem 110 may include a communication module 510, which may be configured to transmit and receive communications over network 125, including receiving mobile device attribute data (e.g., location data) from and providing traffic condition data to mobile devices 120 by way of network 125. The communication module 510 may include and/or support any suitable communication platforms and technologies for communicating with and transporting data and/or communications to/from mobile devices 120 over network 125. Communication module 510 may be configured to support a variety of communication platforms, protocols, and formats such that traffic monitoring subsystem 110 can receive data from and distribute data to mobile devices 120 having a variety of platforms (e.g., a mobile telephone service platform, a navigation service platform, etc.) and using a variety of communications technologies. Accordingly, traffic monitoring subsystem 110 may support a multi-platform system in which data may be received from and provided to diverse platforms. In certain embodiments, communication module 510 is configured to send and receive communications and/or data over a mobile telephone network.

FIG. 6 illustrates an exemplary traffic monitoring system 600 in which traffic monitoring subsystem 110 is configured to receive mobile device attribute data from one or more mobile devices 120 over a mobile telephone network 610. In system 600, traffic monitoring subsystem 110 may utilize the mobile device attribute data to generate traffic condition data and provide the traffic condition data to one or more of the mobile devices 120 over the mobile telephone network 610. Traffic monitoring subsystem 110 may be further configured to make the traffic condition data available to at least one access device 620 over another network 630 such as the Internet. Accordingly, a user associated with one or both of access device 620 and mobile device 120-1 may use either device to access traffic condition data generated based on mobile device attribute data received from mobile devices 120. Access device 620 may include any device (e.g., a computing device with a browser) configured to connect to the other network 630 and to access traffic condition data over the other network 630.

Returning to FIG. 5, traffic monitoring subsystem 110 may include a processing module 520 configured to control operations of one or more components of the traffic monitoring subsystem 110. Processing module 520 may execute or direct execution of operations in accordance with computer-executable instructions stored to a computer-readable medium such as a data store 530. As an example, processing module 520 may be configured to process (e.g., encode, decode, modulate, and/or demodulate) data and/or communication signals received from or to be transmitted to mobile devices 120 over network 125. As another example, processing module 520 may be configured to perform data management operations for storing data to data store 530 and for identifying, indexing, searching, retrieving, modifying, annotating, and/or deleting data stored in data store 530.

Data store 530 may include one or more data storage media, devices, or configurations and may employ any type, form, and combination of storage media. For example, data store 530 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof.

Data store 530 may store any suitable type or form of electronic data. As shown in FIG. 5, data store 530 may include attribute data 540, map data 550, traffic condition data 560, and profile data 570. Attribute data 540 may include any mobile device attribute data described above, including mobile device location data, associated time data, speed data, velocity data, directional heading data, acceleration data, and any other data descriptive of an attribute of a mobile device 120. Attribute data 540 may include mobile device attribute data received from mobile devices 120 and/or derived by traffic monitoring subsystem 110.

Map data 550 may include data representative of or otherwise associated with one or more geographic areas and physical features associated with the geographic areas. In certain embodiments, map data 550 includes street map data descriptive of streets and/or related features of one or more geographic areas. Any suitable form of street map data may be employed, including open or proprietary street map data provided by a third party.

Traffic condition data 560 may include data representative of one or more traffic conditions such as traffic conditions descriptive of vehicular traffic on one or more streets (i.e., street traffic conditions). Traffic condition data 560 may include, but is not limited to, traffic density information, traffic congestion information, traffic speed data (e.g., average speed for a traffic monitoring location), distance between vehicles (e.g., average distance between vehicles in a traffic monitoring location), traffic flow information, traffic volume information, and/or any other information descriptive of one or more traffic conditions. As described further below, traffic monitoring subsystem 110 may be configured to generate traffic condition data 560 based on attribute data 540.

Profile data 570 may include any data associated with profiles of users of mobile devices 120 and/or other users accessing traffic condition data provided by traffic monitoring subsystem 110. As described further below, profile data 570 may be utilized to create individual traffic monitoring and reporting parameters.

As shown in FIG. 5, traffic monitoring subsystem 110 may include a traffic monitoring module 580, which may include or be implemented as hardware, as computing instructions (e.g., software) tangibly embodied on a computer-readable medium, or as a combination of hardware and computing instructions configured to perform, or direct processing module 520 to perform, one or more of the traffic monitoring and/or reporting operations described herein.

Traffic monitoring module 580 may be configured to define and provide data representative of data collection heuristic 380 and/or updates to the data collection heuristic 380 to mobile devices 120. Each mobile device 120 may receive, incorporate, and utilize the data collection heuristic 380 and/or updates as described above. Accordingly, traffic monitoring subsystem 110 may dynamically control the collection and reporting of mobile device attribute data that may be used to generate traffic condition data 560, including defining one or more traffic monitoring locations 410.

Traffic monitoring module 580 may be configured to utilize map data 550 to define traffic monitoring locations 410. For example, traffic monitoring module 580 may be configured to translate map data 550 to obtain location coordinates, such as GPS coordinates, that correspond with geographic areas and that may be used to define traffic monitoring locations 410. Accordingly, traffic monitoring locations 410 may be defined based on street locations and/or other features indicated in the map data 550.

Figure 7:
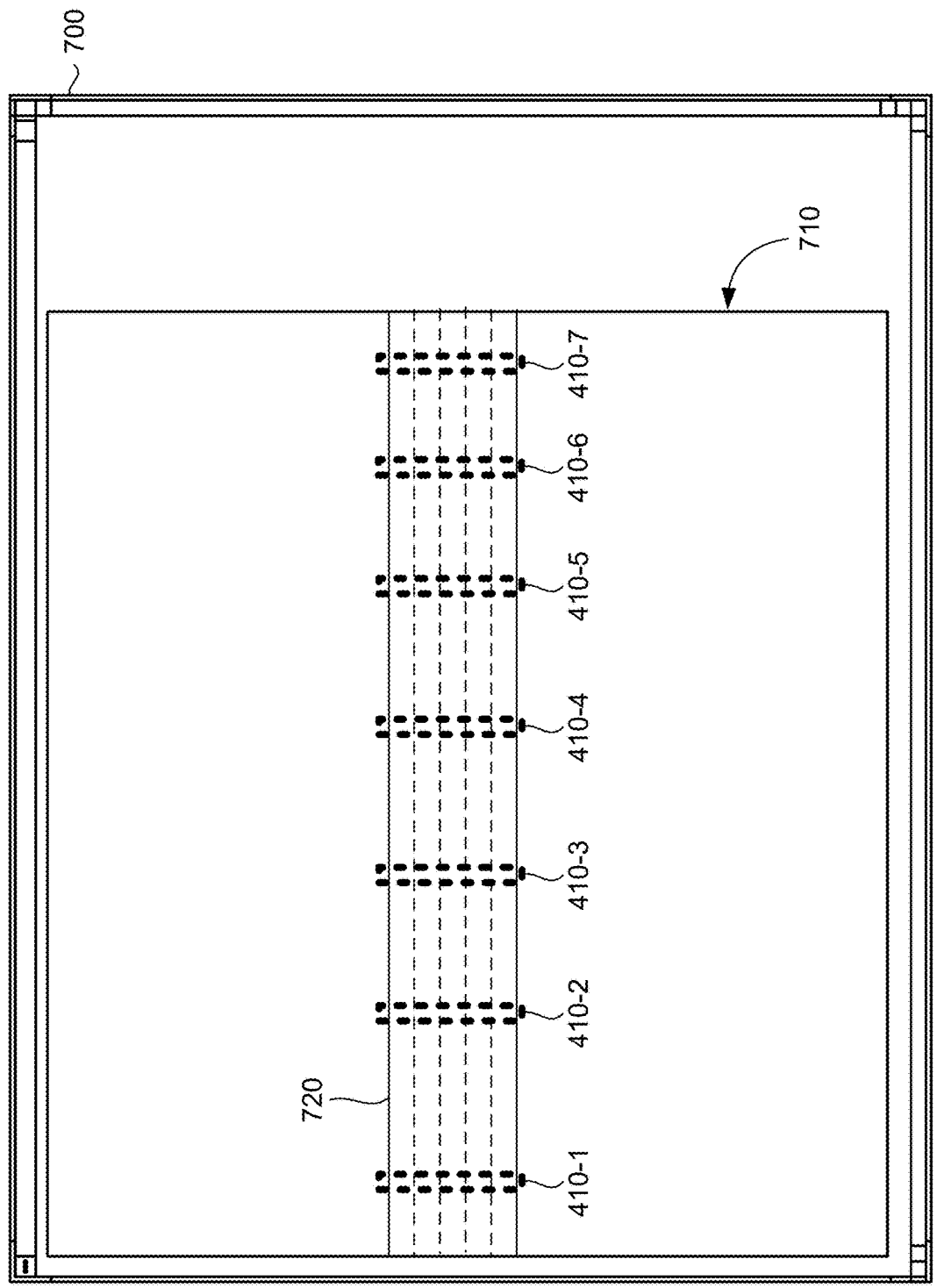
FIG. 7 illustrates a graphical user interface having a map view and exemplary traffic monitoring locations displayed therein.

In certain embodiments, traffic monitoring module 580 may be configured to provide a user (e.g., an operator of traffic monitoring subsystem 110 and/or user associated with mobile device 120 or access device 620) with one or more tools for viewing or otherwise using map data 550. For example, traffic monitoring subsystem 110 may utilize map data 550 to provide the user with a map view display and one or more tools for using the map view display to select geographic locations at which traffic conditions will be monitored. For instance, a tool may enable the user to define a traffic monitoring location at a position or area displayed in a map view. FIG. 7 illustrates an exemplary graphical user interface ("GUI") 700 that may be presented to the user. GUI 700 may be presented by traffic monitoring subsystem 110, mobile device 120, and/or access device 620. GUI 700 may include a map view 710 of a certain geographic area. A user may utilize one or more tools in GUI 700 to define one or more traffic monitoring locations 410 in the geographic area. In the example shown, traffic monitoring locations 410-1 through 410-7 have been defined at different locations along a street route 720 shown in map view 710.

Traffic monitoring module 580 may recognize user input defining a geographic location and translate the selected geographic location into one or more location coordinates (e.g., GPS coordinates) and/or other information defining the geographic location. Data representative of the location coordinates and/or other information defining the geographic location may then be used to define the data collection heuristic 380, which may be provided to and utilized by mobile devices 120 as described above to identify and provide "relevant" mobile device attribute data, e.g., mobile device attribute data associated with mobile devices 120 located within a traffic monitoring location 410, to the traffic monitoring subsystem 110.

Traffic monitoring module 580 may be configure to define and provide updates to the data collection heuristic 380, including defining and providing modifications to traffic monitoring locations 410. In certain embodiments, this may be performed automatically based on and/or in response to detection of a predefined traffic condition. For example, traffic monitoring subsystem 110 may generate traffic condition data indicative of a certain level of traffic congestion at a traffic monitoring location 410. The detected level of congestion may exceed a predetermined congestion threshold, which may trigger certain operations such as traffic monitoring subsystem 110 modifying (e.g., expanding) the geographic area of the traffic monitoring location 410 and/or increasing the frequency of data collection at the traffic monitoring location 410. Such updates may be provided to mobile devices 120 for incorporation in the data collection heuristic 380. Accordingly, more data points may be collected at the traffic monitoring location 410. In this or similar manner, traffic monitoring subsystem 110 may dynamically change data collection and filtering parameters to "zero in" on a detected traffic condition such as a high traffic congestion rate.

Traffic monitoring subsystem 110 may receive mobile device attribute data from mobile devices 120 over network 125. As mentioned above, in certain embodiments traffic monitoring module 580 may be configured to compute derivative attribute data from mobile device attribute data received from mobile devices 120. Derivative attribute data may be stored in data store 530 as part of attribute data 540.

Traffic monitoring locations 410 may be defined to enable collection of data sufficient for computing derivative attribute data. In certain embodiments, for example, at least two location data points and corresponding time data may be collected for a mobile device 120 at a traffic monitoring location 410 and the collected data used to compute speed, velocity, and/or heading data for the mobile device 120. Of course, any suitable number of data points may be collected for a mobile device 120 located at a traffic monitoring location 410.

Traffic monitoring module 580 may be configured to selectively aggregate mobile device attribute data 540 in any way that may be helpful for computing traffic condition data 560. For example, attribute data 540 may be selectively aggregated based on location data values. Accordingly, attribute data 540 may be selectively aggregated by traffic monitoring locations 410 such that the attribute data 540 associated with a particular traffic monitoring location 410-1 may be aggregated. As another example, attribute data 540 may be selectively aggregated based on speed data values. For instance, attribute data 540 associated with a particular speed value, or values within a particular speed range, may be aggregated. Other examples of data aggregation may include, but are not limited to, aggregating attribute data 540 by time data values and/or directional heading values. Attribute data 540 may be aggregated based on any suitable combination of data values, such as by speed and time values for a particular traffic monitoring location 410. As an example, mobile device attribute data associated with mobile devices 120 within a traffic monitoring location and traveling in substantially the same direction may be aggregated and utilized to generate traffic condition data.

In certain embodiments, selective aggregation of attribute data 540 may include actively excluding one or more instances of attribute data 540 from an aggregate group. For example, traffic monitoring module 580 may be configured to identify and exclude from an aggregate grouping any attribute data 540 that is determined to be anomalous. Exclusions of anomalous attribute data 540 from an aggregate group may be used to prevent attribute data 540 that is not relevant to traffic conditions or that does not accurately represent actual traffic flow. For instance, a particular mobile device 120 in a vehicle 220 that has pulled off and stopped along a side of a street or a particular mobile device 120 that is being carried by a pedestrian walking on a sidewalk may be located within or proximate to a traffic monitoring location 410. Consequently, mobile device 120 may provide mobile device attribute data for the mobile device 120 to traffic monitoring subsystem 110. However, the attributes of the mobile device 120 in the stopped vehicle 220 or being carried by a pedestrian walking nearby a street may not accurately represent actual traffic conditions for vehicles 220 driving on the street. Traffic monitoring module 580 may be configured to recognize such anomalous data and to exclude it from aggregated data.

Traffic monitoring module 580 may include a data exclusion heuristic that may define one or more parameters for identifying "anomalous" attribute data 540 and that may be used to determine whether attribute data 540 will be treated as "anomalous." The data exclusion heuristic may be defined as may suit a particular implementation. In certain embodiments, for example, definitions of "anomalous" data may be based on a threshold level of variation from other data points and/or on the number of other data points as compared with the number of "anomalous" data points.

Figure 8:
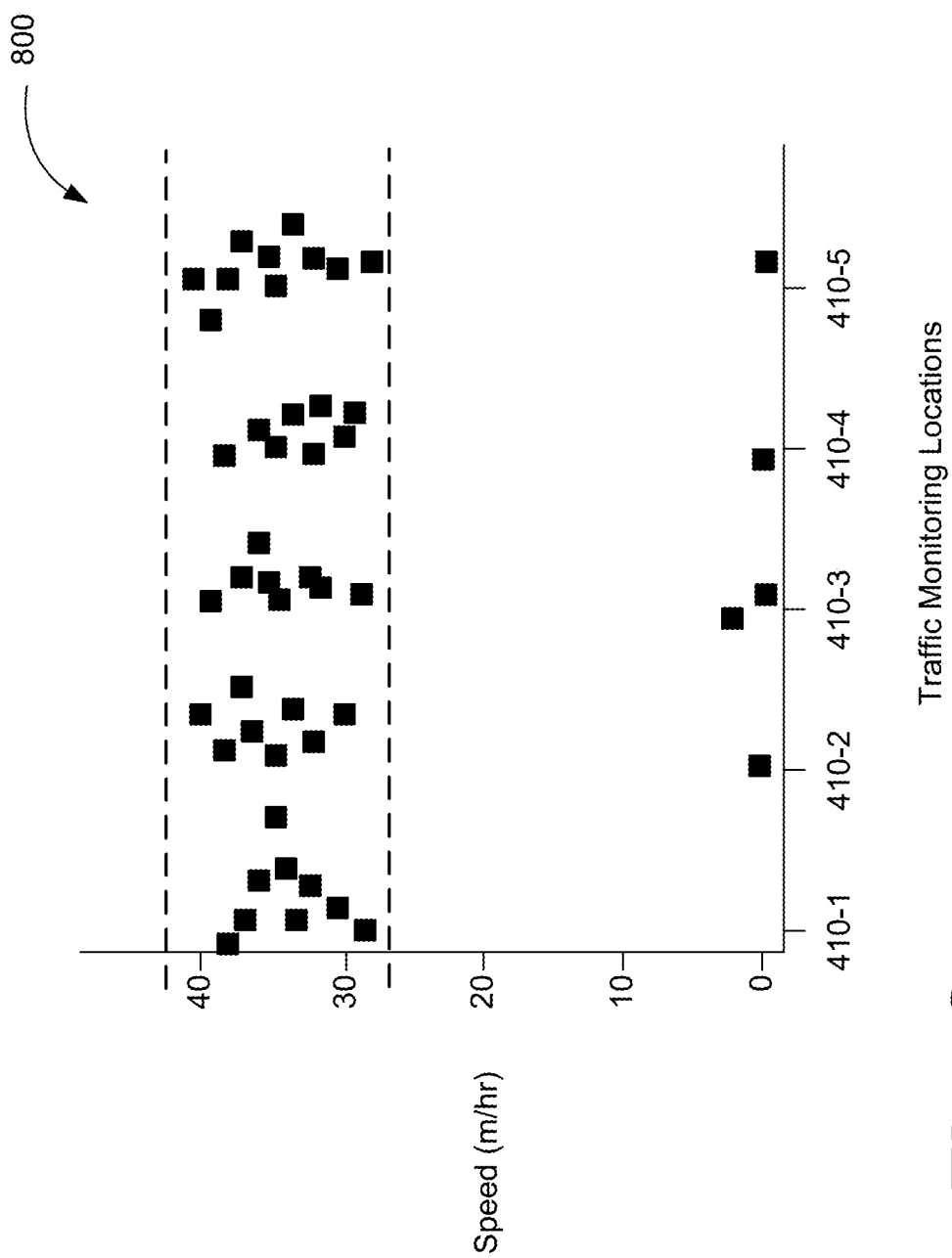
FIG. 8 is a graph illustrating anomalous speed data points in relation to other speed data points.

FIG. 8 illustrates an example of "anomalous" data points that may be excluded from aggregate data based on variation from other data points. FIG. 8 shows a graph 800 of speed data points for mobile devices 120 located within traffic monitoring locations 410-1 through 410-5 of FIG. 7. In graph 800, speed is plotted along the y-axis, and traffic monitoring locations 410-1 through 410-5 are plotted along the x-axis. As shown, most of the speed data points are associated with approximate speeds within a range of about thirty to forty miles per hour (30-40 mph). A few data points, however, are associated with speeds of about zero miles per hour (0 mph). Traffic monitoring module 580 may be configured to utilize the data exclusion heuristic to recognize such data points as anomalies that vary by at least a predetermined threshold from other data points, and to exclude the anomalous data points from being aggregated with the other data points.

Excluding attribute data 540 from aggregation based on variations in speed data is illustrative only. Other data, combinations of data, or exclusion parameters may be used to identify and exclude "anomalous" data. For example, a data point having a directional heading value that is significantly different from the of directional heading values of other data points may be determined to be anomalous and excluded from an aggregate group. A different directional heading may be indicative of a mobile device 120 being in a vehicle that is turning off of route 720, preparing to turn onto route 720, or otherwise traveling in a different direction than traffic flow.

As another example, speed, velocity, and/or acceleration data over time may be analyzed to identify "anomalous" data to be excluded from an aggregation. Location and/or time data may also be used to exclude "anomalous" data. As an example, attribute data 540 associated with mobile devices 120 located at or near the boundaries of a traffic monitoring location 410 may be excluded. Accordingly, mobile devices 120 located near the boundaries and that may not be reflective of actual traffic conditions within the traffic monitoring location 410 may be excluded from aggregation. Such exclusions may help compensate for accuracy limitations associated with location data.

As another example, traffic monitoring module 580 may be configured to analyze signal strength data descriptive of the strength of communication signals received by or from mobile devices 120. Patterns in signal strength may be utilized to identify and exclude "anomalous" data from an aggregation, or to identify "relevant" data to be included in an aggregation. For example, a certain signal strength value or range of signal strength values may be common for mobile telephones being transported in vehicles 220. Such data may be used, including in conjunction with other data, to determine whether a mobile device 120 is associated with attributes characteristic of a mobile device 120 that is representative of traffic conditions.

Traffic monitoring module 580 may be configured to utilize attribute data 540, including aggregate attribute data 540, to compute traffic condition data 560. As mentioned above, traffic condition data 560 may include data representative of one or more traffic conditions, including traffic density information, traffic congestion information, traffic speed data, distances between mobile devices 120, traffic flow information, traffic volume information, and any other information descriptive of traffic conditions.

As an example of computing traffic condition data 560, traffic monitoring module 580 may be configured to compute traffic flow rates for traffic monitoring locations 410. For a particular traffic monitoring location 410-1, for example, traffic monitoring module 580 may compute a traffic flow rate to equal a number of mobile devices 120 (excluding anomalous mobile device attribute data) to travel through the traffic monitoring location 410-1 in a certain time period (e.g., one minute). Another example may include traffic monitoring module 580 computing an average speed for mobile devices 120 located within a traffic monitoring location 410-1 at a given time or an average speed for mobile devices 120 to have traveled through the traffic monitoring location 410-1 within a certain time period. Another example may include traffic monitoring module 580 computing a number of mobile devices 120 traveling approximately at a certain speed or within a certain range of speeds within the traffic monitoring location 410-1 at a given time or to have travelled through the traffic monitoring location 410-1 within a certain time period. Yet other examples may include traffic monitoring module 580 computing distances between mobile devices 120 associated with a traffic monitoring location 410-1, an average distance between mobile devices 120 located within the traffic monitoring location 410-1 at a given time, or an average distance between mobile devices 120 to have traveled through the traffic monitoring location 410-1 within a certain time period. These examples are illustrative only. Traffic monitoring module 580 may be configured to utilize attribute data 540 to compute other traffic condition data descriptive of traffic conditions.

FIGS. 9-12 graphically illustrate examples of traffic condition data 560 that may be computed by traffic monitoring module 580 based on attribute data 540. FIG. 9 is a graph 900 having a number of mobile devices 120 (y-axis) plotted against speed (x-axis). Traffic condition data 560 for traffic monitoring locations 410-3, 410-4, and 410-5 of FIG. 7 is shown in the graph 900. FIG. 9 shows that approximately eighty mobile devices 120 associated with traffic monitoring location 410-3 have an average speed of forty-three miles per hour (43 mph), approximately seventy mobile devices 120 associated with traffic monitoring location 410-4 have an average speed of ten miles per hour (10 mph), and approximately one hundred mobile devices 120 associated with traffic monitoring location 410-5 have an average speed of five miles per hour (5 mph). To compute this traffic condition data 560, traffic monitoring module 580 may aggregate attribute data 540 by traffic monitoring location 410, excluding anomalous data, determine the number of mobile devices 120 associated with each traffic monitoring location 410, and compute the average speed of the mobile devices 120 associated with each traffic monitoring location 410.

FIG. 9 further indicates a normal speed zone 910, which may define a range of normal speeds for route 720 in FIG. 700. The normal speed zone 910 may be defined in any suitable way. For example, the normal speed zone 910 may be based on a legal speed limit and/or historical speeds and traffic patterns.

The normal speed zone 910 may be utilized by the traffic monitoring module 580 to compute traffic condition data 560 and/or to provide output descriptive of traffic conditions. For instance, the traffic monitoring module 580 may be configured to provide a notification when the average speed for a traffic monitoring location 410-4 is outside of the normal speed zone 910, or when a threshold number or percentage of mobile devices 120 associated with the traffic monitoring location 410-4 have speeds that are outside of the normal speed zone 910.

Figure 10A:
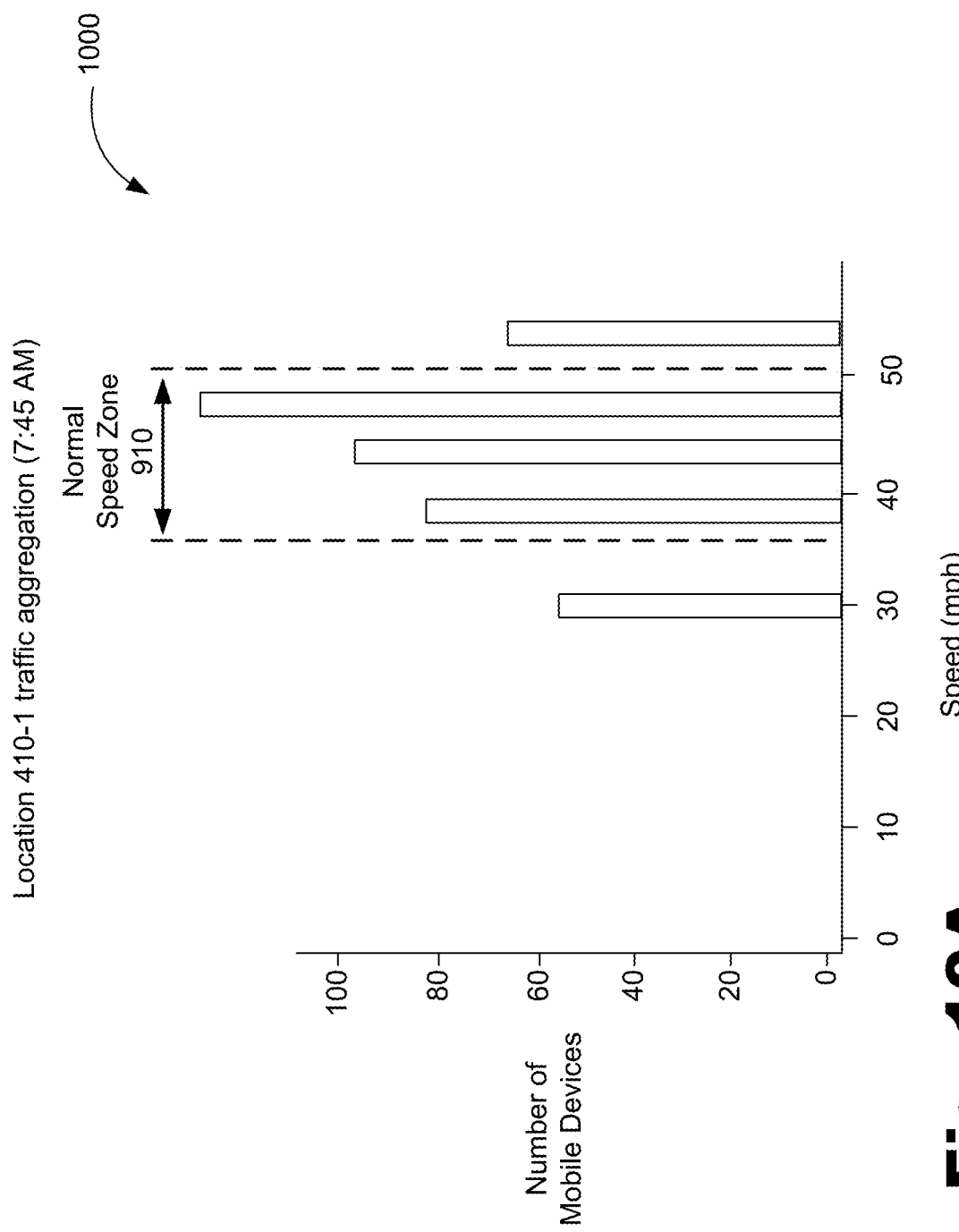
FIG. 10A is a graph of exemplary traffic condition data and in which a number of mobile devices is plotted against speed of the mobile devices for a particular traffic monitoring location at a particular time.

FIG. 10A is a graph 1000 having a number of mobile devices 120 (y-axis) plotted against speed (x-axis) for a particular traffic monitoring location 410-1. As shown in FIG. 10A, of the mobile devices 120 associated with traffic monitoring location 410-1, nearly sixty mobile devices 120 have a speed of approximately thirty miles per hour (30 mph), approximately eighty mobile devices 120 have a speed of nearly forty miles per hour (40 mph), approximately ninety mobile devices 120 have a speed of approximately forty-three miles per hour (43 mph), over one hundred mobile devices 120 have a speed of approximately forty-eight miles per hour (48 mph), and over sixty mobile devices 120 have a speed of over fifty miles per hour (50 mph). As shown, the speeds of a majority of the mobile devices 120 associated with traffic monitoring location 410-1 are within the normal speed zone 910 associated with traffic monitoring location 410-1.

Figure 10B:
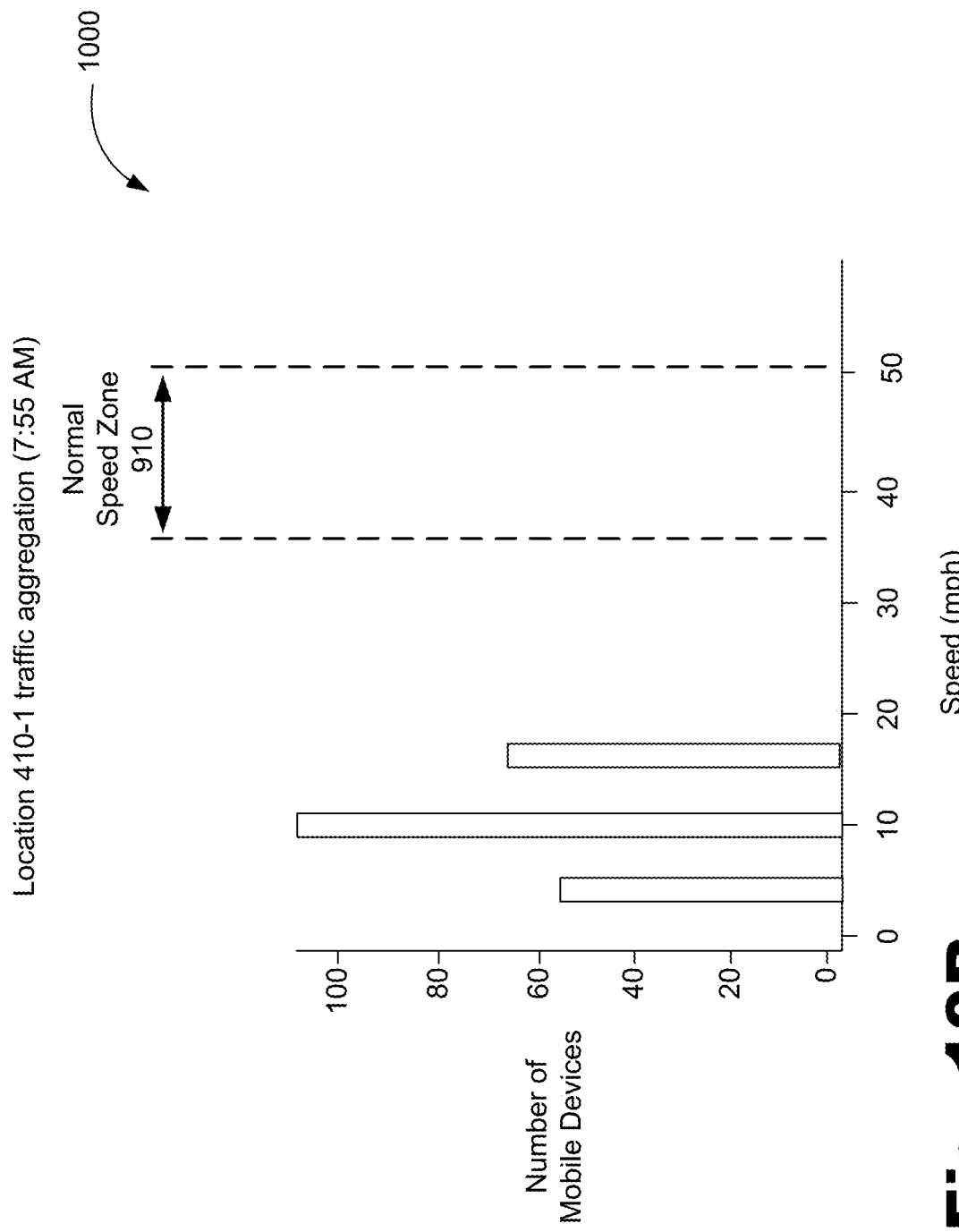
FIG. 10B is the graph of FIG. 10A with a number of mobile devices plotted against speed of the mobile devices for a particular traffic monitoring location at another time.

The traffic condition data illustrated in FIG. 10A is a snapshot of traffic conditions at traffic monitoring location 410-1 at a specific time. In the example, shown, FIG. 10A shows data for traffic monitoring location 410-1 at 7:45 AM. FIG. 10B illustrates graph 1000 with traffic condition data as detected at a later time—7:55 AM. As shown, the number of mobile devices 120 associated with traffic monitoring location 410-1 and the speeds of the mobile devices 120 have changed over a ten minute time period. In FIG. 10B, of the mobile devices 120 associated with traffic monitoring location 410-1 at 7:55 AM, nearly sixty mobile devices 120 have a speed of approximately five miles per hour (5 mph), over one hundred mobile devices 120 have a speed of approximately ten miles per hour (10 mph), and over sixty mobile devices 120 have a speed of approximately seventeen miles per hour (17 mph). At 7:55 AM, all of the mobile devices 120 associated with traffic monitoring location 410-1 have speeds outside of the normal speed zone 910. The traffic condition data illustrated in FIGS. 10A-B may be evidence of a decrease in traffic speed and/or flow, an increase in traffic congestion, and/or another traffic problem at traffic monitoring location 410-1. The number of mobile devices 120 associated with traffic monitoring location 410-1 may have decreased from 7:45 AM to 7:55 AM because of the slower speeds of the mobile devices 120. At slower speeds, fewer mobile devices 120 may travel within or through traffic monitoring location 410-1 in at a given time or within a certain time period. Traffic monitoring module 580 may be configured to account for such things when generating traffic condition data 560.

FIG. 11 is a graph 1100 having a traffic congestion rate (y-axis) plotted against traffic monitoring locations 410-1 through 410-7 (x-axis) positioned along route 720 of FIG. 7. As shown, the traffic congestion rate may vary from one traffic monitoring location to another along route 720. A traffic congestion rate may be defined in any suitable way and may be computed by traffic monitoring module 580. In certain embodiments, the traffic congestion rate may be defined to equal the number of mobile devices 120 associated with a traffic monitoring location 410 divided by the average speed of the mobile devices 120. Other definitions of traffic congestion rate may be used in other embodiments.

As shown in FIG. 11, the traffic congestion rate for traffic monitoring location 410-5 exceeds a predetermined congestion threshold 1110. The congestion threshold 1110 may be defined as may suit a particular application, route 720, and/or traffic monitoring location 410. The congestion threshold 1110 may be utilized to determine when to provide notification of traffic congestion. For example, when the traffic congestion rate exceeds the congestion threshold 1110, traffic monitoring module 580 may generate and provide notification. Traffic monitoring subsystem 110 may be configured to provide notifications, such as a traffic congestion notification, over network 125, including to one or more mobile devices 120 over network 125.

Traffic monitoring subsystem 110 may be configured to confirm generated traffic conditions. As an example, traffic monitoring module 580 may be configured to compute distances between mobile devices 120 associated with a traffic monitoring location 410 and utilize the computed distances to confirm a computed traffic congestion rate. For traffic monitoring location 410-5 having a computed traffic congestion rate exceeding the congestion threshold 1110, for instance, traffic monitoring module 580 may be configured to compute distances between the mobile devices 120 associated with traffic monitoring location 410-5 and utilize the computed distances to confirm the detected traffic congestion rate. FIG. 12 is a graph 1200 having a number of mobile devices 120 (y-axis) plotted against distance between mobile devices (x-axis). In the example shown in FIG. 12, approximately thirty mobile devices 120 are located approximately ten feet (10 ft) from one another. As shown, the number of mobile devices 120 tapers off as the distance between the mobile devices 120 increases. Such a representation of traffic condition data 560 may be indicative of the existence of traffic congestion at traffic monitoring location 410-5, and traffic monitoring module 580 may be configured to treat this as confirmation of the computed traffic congestion rate for traffic monitoring location 410-5. In this or similar manner, traffic monitoring module 580 may use mobile device attribute data 540, including derivative data and/or patterns in the data, to confirm or refute detected traffic conditions. In certain embodiments, traffic monitoring module 580 may be configured to provide notification of a detected traffic condition only after corroborating data confirms the detected traffic condition.

Traffic monitoring module 580 may be configured to determine and associate a confidence factor with generated traffic condition data 560. In certain embodiments, for example, a confidence factor may be determined based on a number of mobile devices 120 that provided attribute data 540 used to generate traffic condition data 560. For instance, if fifty mobile devices 120 reported data indicative of congestion at a traffic monitoring location 410, a "high" confidence factor may be associated with the congestion. If only two mobile devices 120 reported data indicative of congestion at a traffic monitoring location 410, a "low" confidence factor may be associated with the congestion. In certain examples, traffic monitoring module 580 may be configured to provide generated traffic condition data 560 for output only after at least a predefined minimum number of mobile devices 120 have provided mobile device attribute data used to generate the traffic condition data 560.

Traffic monitoring subsystem 110 may be configured to provide traffic condition data 560, notifications of traffic conditions, confidence factors, and/or related data as output. Such output may be referred to collectively as "output data." In certain embodiments, traffic monitoring subsystem 110 may provide output data over network 125 to one or more mobile devices 120. In certain embodiments, output data may additionally or alternatively be provided to other access devices such as by providing output data to access device 620 over another network 630 (FIG. 6). Output data may be provided in any suitable format (e.g., audio, visual, multimedia, etc.) and/or in accordance with any suitable protocol.

Along with providing traffic condition data 560 as output, traffic monitoring subsystem 110 may be configured to provide data representative of confidence factors associated with the traffic condition data 560. For example, along with providing traffic condition data 560 indicative of traffic congestion at a traffic monitoring location 410, traffic monitoring subsystem 110 may provide data indicating a "high" or "low" confidence factor corresponding with the traffic condition data 560. Other scales (e.g., a numerical scale) of confidence may be used in other implementations. In certain embodiments, traffic monitoring subsystem 110 may be configured to provide a confidence factor indicating a number of mobile devices 120 providing mobile device attribute data used to generate and/or corroborating traffic condition data. A confidence factor may enable a user of a mobile device 120 to generate an informed opinion of the confidence level to attribute to traffic condition data 560.

In certain embodiments, traffic monitoring subsystem 110 may be configured to selectively provide output data to one or more of the mobile devices 120. For example, output data may be selectively provided based on mobile device attribute data associated with a mobile device 120. Traffic monitoring subsystem 110 may include an output heuristic defining one or more conditions for providing output data to mobile devices 120. The conditions may be defined as may suit a particular implementation and traffic condition.

As an example, mobile device attribute data may be utilized to determine a geographic location of a mobile device 120 in relation to the location of a detected traffic condition. If the mobile device 120 is located within a predetermined distance of the traffic condition, is located along the same route 720 as the traffic condition, is traveling toward the traffic condition, or has another predetermined relationship with the traffic condition, traffic monitoring subsystem 110 may provide output data descriptive of the traffic condition to the mobile device 120. For example, traffic monitoring subsystem 110 may provide the mobile device 120 with a notification message alerting of a detected traffic congestion rate at a traffic monitoring location 410.

Mobile devices 120 may be configured to receive output data from traffic monitoring subsystem 110, and process and present at least a subset of the output data for consideration of users of the mobile devices 120. The output data may be presented in any suitable way, including but not limited to, visual, audio, audiovisual, haptic, and multimedia presentations. In certain embodiments, for instance, traffic condition data 560 indicative of traffic conditions may be visually displayed in a graphical user interface. As an example, any of the graphs 900, 1000, 1100, and 1200 shown in FIGS. 9-12 may be presented in a graphical user interface shown in a display. As another example, a map view having visual indicators of traffic conditions may be displayed. For instance, visual indicators of traffic conditions may be inserted in (e.g., as overlays on) the map view 710 shown in FIG. 7. In some examples, the visual indicators may indicate detected traffic flow rates at one or more traffic monitoring locations 410.

In certain embodiments, output data may be presented audibly. For example, a mobile device 120 may be configured to convert output data received from traffic monitoring subsystem 110 to audio format and playback the audio to a user (e.g., "Fifty subscribers reporting traffic congestion one mile ahead"). Any suitable technologies may be employed for converting data to audio format and playing back the audio. Audio output may be especially useful and/or appropriate for users who are operating vehicles 220.

Traffic monitoring subsystem 110 may receive mobile device attribute data, generate traffic condition data, and provide output data in real time. Monitoring device 120 may be configured to receive and present at least a subset of the output data in real time. Accordingly, users may have access to real time traffic condition information. In certain embodiments, any of the real time traffic monitoring and reporting processes and data described herein may be provided as a service to one or more subscribers.

System 100 may be configured to customize operations for individual users. As mentioned above, profile data 570 may be maintained for users of mobile devices 120 and/or other users subscribing to services provided by traffic monitoring subsystem 110. The profile data 570 may include individual traffic monitoring and reporting settings for different users. In certain embodiments, traffic monitoring subsystem 110 may be configured to define individual settings in the profile data 570 based on historical data such as historical travel routes of a mobile device 120. For example, a particular user associated with a mobile device 120 may regularly commute from home to work each weekday morning. Traffic monitoring subsystem 110 may be configured to collect location and/or time data from the mobile device 120 associated with the user and utilize the location and/or time data to identify patterns in the behavior of the user, including, for example times at which the user begins the commute and/or one or more travel routes driven by the user from home to work.

Leveraging the historical data, traffic monitoring subsystem 110 may be configured to recognize when the user begins the morning commute from home to work. In response to this recognition, traffic monitoring subsystem 110 may provide traffic condition data 560 for one or more possible travel routes from home to work, including routes traveled by the user in the past and/or alternate routes mapped from the map data 550 by the traffic monitoring subsystem 110. For example, when the user begins the morning commute, system 110 may automatically provide traffic condition data 560 associated with the possible routes of travel to the mobile device 120. Such traffic condition data 560 may include estimated travel times, notifications, traffic flow information, and/or congestion rates for possible routes. This information may assist the user in selecting an efficient travel route.

System 100 may be configured to enable users of mobile devices 120 to customize individual traffic monitoring and reporting settings. For example, a user may utilize traffic agent facility 370 within mobile device 120 to define and/or select travel route options to be considered for a morning commute. These options may be stored in the user's profile data 570. Traffic monitoring subsystem 110 may recognize from mobile device attribute data when the user begins the morning commute, access the custom settings in the user profile data 570, and automatically generate and provide traffic condition data 570 for the user-defined travel routes. As another example, the user may define a certain time at which traffic condition data 560 for the travel routes will be obtained and provided to the mobile device 120 and/or access device 620 associated with the user. For instance, at 7:30 AM, traffic monitoring subsystem 110 may automatically deliver traffic conditions for one or more travel routes to the mobile device 120 and/or access device 620.

Users of mobile devices 120 may report observed traffic conditions, such as traffic congestion, vehicle collisions, law enforcement operations, emergency personnel operations, and road closures, for example. Traffic agent facility 370 may be configured to provide one or more tools enabling a user of a mobile device 120 to conveniently report observed traffic conditions. As an example, traffic agent facility 370 may provide an input mechanism configured to enable a user of a mobile device 120 to report a certain type of traffic condition with a single touch of a button (i.e., one-touch traffic condition reporting). This may be accomplished in any suitable manner, including providing a soft key input mechanism configured to enable a user to report a certain type of traffic condition with the touch of a button. For instance, with traffic agent facility 370 running, a button may be associated with a vehicle collision. If the user of the mobile device 120 observes a vehicle collision, the user may touch the button to initiate reporting of the vehicle collision to traffic monitoring subsystem 110. The mobile device 120 may detect user input, e.g., the touch of the button, and provide corresponding traffic condition information, e.g., information indicative of a vehicle collision, to the traffic monitoring subsystem 110 based on the user input. Location data associated with the mobile device 120 may be obtained and associated with the reported traffic condition information to identify the location of the vehicle collision. In this or similar manner, a user may utilize mobile device 120 to conveniently provide traffic condition information to the traffic monitoring subsystem 110.

In certain embodiments, traffic monitoring subsystem 110 may be configured to confirm reported traffic condition information with corroborating information received from one or more other mobile devices 120. When a predetermined number of users has provided corroborating information, a reported traffic condition may be confirmed and traffic condition data 560 representative of the traffic condition may be provided over network 125.

Traffic monitoring subsystem 110 may be configured to utilize reported traffic condition information to confirm generated traffic condition data 560. For example, a report of congestion from a user may confirm the accuracy of a computed traffic congestion rate.

Figure 13:
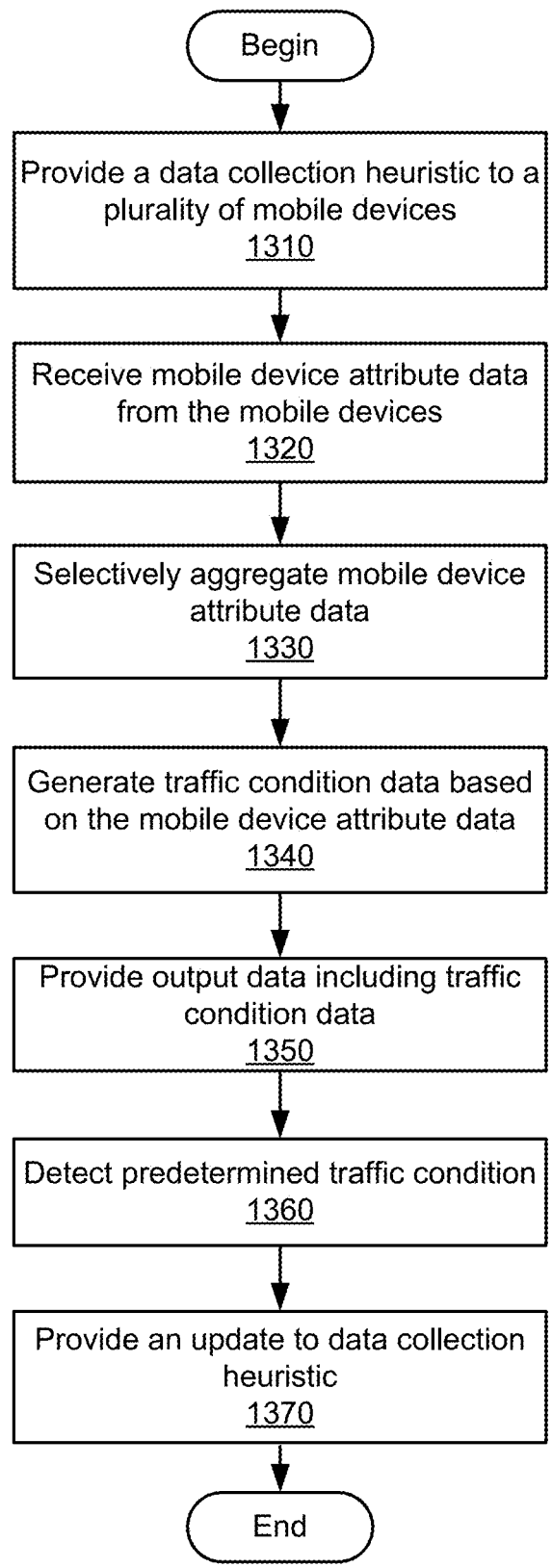
FIG. 13 illustrates an exemplary method of traffic monitoring and reporting from a traffic monitoring subsystem perspective.

FIG. 13 illustrates an exemplary method of traffic monitoring and reporting from a traffic monitoring subsystem perspective. While FIG. 13 illustrates exemplary steps according to one embodiment, other embodiments may omit, add to, reorder, and/or modify any of the steps shown in FIG. 13.

In step 1310, a data collection heuristic is provided to a plurality of mobile devices 120. As described above, the data collection heuristic may include a set of rules by which mobile device attribute data may be collected and/or reported by the mobile devices 120. Step 1310 may be performed in any of the ways described above, including traffic monitoring subsystem 110 transmitting at least a portion of data collection heuristic 380 to one or more mobile devices 120.

In step 1320, mobile device attribute data is received from the mobile devices 120. The mobile device attribute data may include at least location data and corresponding time data for the mobile devices 120. Step 1320 may be performed in any of the ways described above, including traffic monitoring subsystem 110 receiving mobile device attribute data from mobile devices 120 over network 125.

In step 1330, mobile device attribute data is selectively aggregated. Step 1330 may be performed in any of the ways described above, including traffic monitoring subsystem 110 selectively aggregating data by traffic monitoring location 410 and/or one or more other criteria. In certain embodiments, step 1330 includes identifying and excluding anomalous data from the aggregate data.

In step 1340, traffic condition data is generated based on mobile device attribute data. Traffic condition data may include any data descriptive of one or more traffic conditions, including any of the examples of traffic condition data described herein. Step 1340 may be performed in any of the ways described above, including the traffic monitoring subsystem 110 utilizing mobile device attribute data 540 to compute traffic condition data 560.

In step 1350, output data including traffic condition data is provided. Step 1350 may be performed in any of the ways described above, including traffic monitoring subsystem 110 providing output data for access over network 125. For example, traffic monitoring subsystem 110 may provide output data to one or more of the mobile devices 120 and/or to access device 620. In certain embodiments, traffic monitoring subsystem 110 may be configured to selectively provide output data, such as by providing output data descriptive of a traffic condition to one or more mobile devices 120 located proximate to the traffic condition.

In step 1360, a predetermined traffic condition (e.g., a traffic congestion rate exceeding a predetermined threshold) is detected. Step 1360 may be performed in any of the ways described above, including traffic monitoring subsystem 110 generating and analyzing traffic condition data 560 to identify existence of the predetermined traffic condition.

In step 1370, an update to the data collection heuristic is provided. The update may be provided in response to the detection of the predetermined traffic condition. Step 1370 may be performed in any of the ways described above. For example, traffic monitoring subsystem 110 may provide an update to be incorporated in the data collection heuristic in order to add a new traffic monitoring location 410 and/or to modify an existing traffic monitoring location 410.

Figure 14:
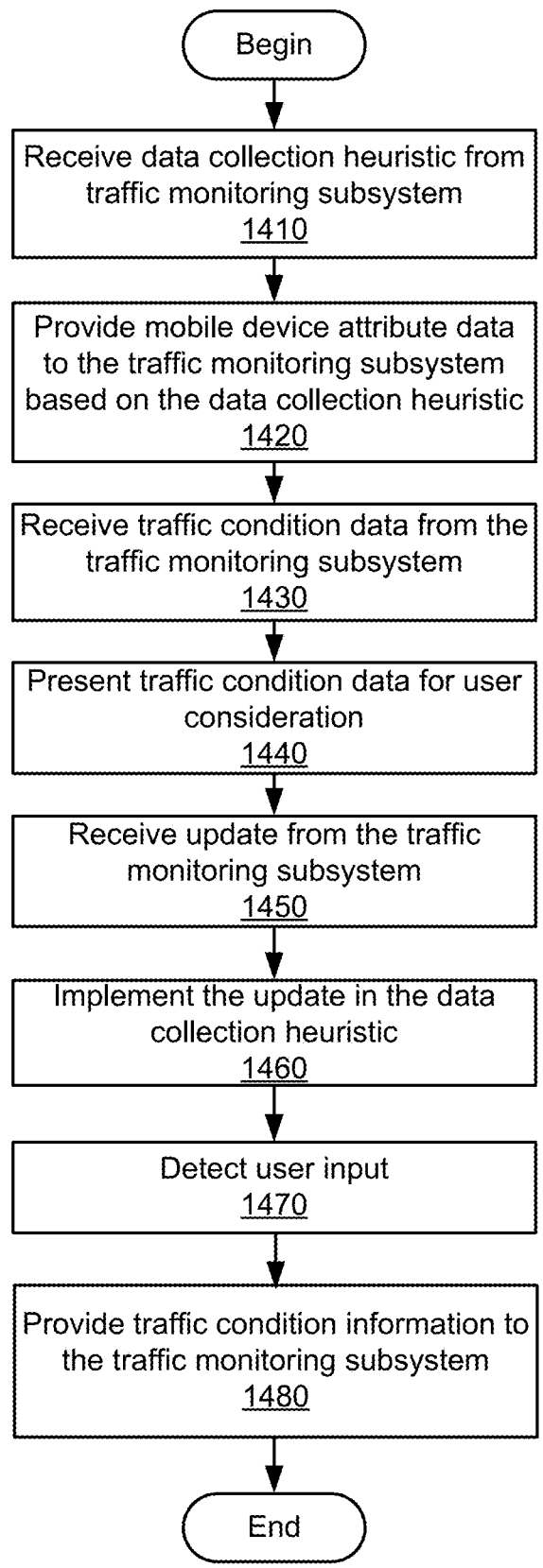
FIG. 14 illustrates an exemplary method of traffic monitoring and reporting from a mobile device perspective.

FIG. 14 illustrates an exemplary method of traffic monitoring and reporting from a mobile device perspective. While FIG. 14 illustrates exemplary steps according to one embodiment, other embodiments may omit, add to, reorder, and/or modify any of the steps shown in FIG. 14.

In step 1410, a data collection heuristic 380 is received from traffic monitoring subsystem 110. Step 1410 may be performed in any of the ways described above, including a mobile device 120 downloading data representative of the data collection heuristic 380 from traffic monitoring subsystem 110 over network 125. In certain embodiments, the data collection heuristic 380 is downloaded upon launch of traffic agent facility 370 on mobile device 120.

In step 1420, mobile device attribute data is provided to the traffic monitoring subsystem 110 based on the data collection heuristic 380. Step 1420 may be performed in any of the ways described above, including transmitting the mobile device attribute data to the traffic monitoring subsystem 110 over network 125 as directed by the traffic agent facility 370 in the mobile device 120.

In step 1430, traffic condition data is received from the traffic monitoring subsystem 110. Step 1430 may be performed in any of the ways described above, including traffic monitoring subsystem 110 transmitting at least a subset of the traffic condition data 560 to the mobile device 120 over network 125.

In step 1440, traffic condition data is presented for user consideration. Step 1440 may be performed in any of the ways described above to present at least a subset of the traffic condition data 560 to a user of mobile device 120.

In step 1450, an update is received from the traffic monitoring subsystem 110. In step 1460, the update is implemented in the data collection heuristic 380 in mobile device 120. Steps 1450 and 1460 may be performed in any of the ways described above.

In step 1470, user input is detected. In step 1480, traffic condition information is provided to the traffic monitoring subsystem 110. Step 1470 and 1480 may be performed in any of the ways described above, including detecting user actuation of a soft key and identifying and transmitting corresponding traffic condition information over network 125 to traffic monitoring subsystem 110. In certain embodiments, step 1480 is performed in response to step 1470.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   identifying, by a traffic monitoring subsystem implemented on one or more servers, a set of geographic location coordinates that define a traffic monitoring location on a street having a traffic flow;
   receiving, by the traffic monitoring subsystem, mobile device attribute data associated with a plurality of mobile devices over a network, the mobile device attribute data including Global Positioning System ("GPS") location data generated by GPS sensors within the plurality of mobile devices and representative of a plurality of geographic locations associated with the plurality of mobile devices;
   selectively aggregating, by the traffic monitoring subsystem, the mobile device attribute data, the selectively aggregating comprising:
      identifying, within the received mobile device attribute data, anomalous data that is associated with a particular mobile device of the plurality of mobile devices and that does not accurately represent the traffic flow on the street at the traffic monitoring location, wherein the particular mobile device is located within the traffic monitoring location either on the street or on a sidewalk proximate to the street, and
      excluding the anomalous data from the aggregated mobile device attribute data;
   generating, by the traffic monitoring subsystem, traffic condition data based at least in part on the aggregated mobile device attribute data, the traffic condition data representative of a traffic condition; and
   providing, by the traffic monitoring subsystem, the traffic condition data to at least one of the plurality of mobile devices for presentation by the at least one of the plurality of mobile devices to at least one user.

2. The method of claim 1, wherein determining that the anomalous data does not accurately represent the traffic flow on the street at the traffic monitoring location uses speed data associated with the plurality of mobile devices.

3. The method of claim 1, wherein determining that the anomalous data does not accurately represent the traffic flow on the street at the traffic monitoring location uses directional heading data associated with the plurality of mobile devices.

4. The method of claim 1, wherein determining that the anomalous data does not accurately represent the traffic flow on the street at the traffic monitoring location uses signal strength data associated with the plurality of mobile devices.

5. The method of claim 1, wherein determining that the anomalous data does not accurately represent the traffic flow on the street at the traffic monitoring location uses a threshold level of variation from other data included in the mobile device attribute data.

6. The method of claim 1, wherein the providing of the traffic condition data to the at least one of the plurality of mobile devices is based on the geographic locations of the mobile devices, as represented by the GPS location data, in relation to the traffic monitoring location.

7. The method of claim 1, further comprising:
   determining, by the traffic monitoring subsystem, a confidence factor associated with said traffic condition data; and
   providing, by the traffic monitoring subsystem, the confidence factor, together with the traffic condition data, to the at least one of the plurality of mobile devices.

8. The method of claim 7, wherein the confidence factor is determined based at least in part on a number of the plurality of mobile devices corroborating the traffic condition data.

9. The method of claim 1, wherein the mobile device attribute data further includes at least one of speed data, direction heading data, and signal strength data.

10. The method of claim 1, wherein the plurality of mobile devices includes at least one vehicle.

11. A tangible computer-readable medium storing instructions that, when executed by a processor, cause the processor to:
identify a set of geographic location coordinates that define a traffic monitoring location on a street having a traffic flow;
receive mobile device attribute data associated with a plurality of mobile devices over a network, the mobile device attribute data including Global Positioning System ("GPS") location data generated by GPS sensors within the plurality of mobile device and representative of a plurality of geographic locations associated with the plurality of mobile devices;
selectively aggregate the mobile device attribute data, the selectively aggregating comprising:
identifying, within the received mobile device attribute data, anomalous data that is associated with a particular mobile device of the plurality of mobile devices and that does not accurately represent the traffic flow on the street at the traffic monitoring location, wherein the particular mobile device is located within the traffic monitoring location either on the street on which the traffic flows or on a sidewalk proximate to the street on which the traffic flows, and
excluding the anomalous data from the aggregated mobile device attribute data;
generate traffic condition data based at least in part on the aggregated mobile device attribute data, the traffic condition data representative of a traffic condition; and
provide the traffic condition data to at least one of the plurality of mobile devices for presentation by the at least one of the plurality of mobile devices to at least one user.

12. A system comprising:
at least one processor and at least one memory storing instructions that, when executed by the at least one processor, cause the at least one processor to:
identify a set of geographic location coordinates that define a traffic monitoring location on a street having a traffic flow;
selectively aggregate mobile device attribute data received from a plurality of mobile devices, the mobile device attribute data including Global Positioning System ("GPS") location data generated by GPS sensors within the plurality of mobile devices and representative of a plurality of geographic locations associated with the plurality of mobile devices, the selective aggregation comprising:
identifying, within the received mobile device attribute data, anomalous data that is associated with a particular mobile device of the plurality of mobile devices and that does not accurately represent the traffic flow on the street at the traffic monitoring location, wherein the particular mobile device is located within the traffic monitoring location either on the street on which the traffic flows or on a sidewalk proximate to the street on which the traffic flows, and
excluding the anomalous data from the aggregated mobile device attribute data;
generate traffic condition data based at least in part on the aggregated mobile device attribute data, the traffic condition data representative of a traffic condition; and
provide the traffic condition data to at least one of the plurality of mobile devices for presentation by the at least one of the plurality of mobile devices to at least one user.

13. The system of claim 12, wherein determining that the anomalous data does not accurately represent the traffic flow on the street at the traffic monitoring location uses speed data associated with the plurality of mobile devices.

14. The system of claim 12, wherein determining that the anomalous data does not accurately represent the traffic flow on the street at the traffic monitoring location uses directional heading data associated with the plurality of mobile devices.

15. The system of claim 12, wherein determining that the anomalous data does not accurately represent the traffic flow on the street at the traffic monitoring location uses signal strength data associated with the plurality of mobile devices.

16. The system of claim 12, wherein determining that the anomalous data does not accurately represent the traffic flow on the street at the traffic monitoring location uses at least a threshold level of variation from other data included in the mobile device attribute data.

17. The system of claim 12, wherein the at least one memory stores additional instructions that, when executed by the at least one processor, cause the at least one processor to:
provide the traffic condition data to the at least one of the plurality of mobile devices based on the geographic locations of the mobile devices, as represented by the GPS location data, in relation to the traffic monitoring location.

18. The system of claim 12, wherein the at least one memory stores additional instructions that, when executed by the at least one processor, cause the at least one processor to:
determine a confidence factor associated with the traffic condition data; and
provide the confidence factor, together with the traffic condition data, to at least one of the mobile devices.

19. The system of claim 18, wherein the confidence factor is determined based at least in part on a number of the mobile devices corroborating the traffic condition data.

20. The system of claim 12, wherein the mobile device attribute data further includes at least one of speed data, direction heading data and signal strength data.

* * * * *